United States Patent [19]

Hoffman et al.

[11] 4,315,108
[45] Feb. 9, 1982

[54] INTEGRATED CIRCUIT CHIP TELEPHONE COMMUNICATION SYSTEM

[75] Inventors: Gordon B. Hoffman, Dallas; Michael J. Callahan, Jr., Garland, both of Tex.

[73] Assignee: Mostek Corporation, Carrollton, Tex.

[21] Appl. No.: 2,424

[22] Filed: Jan. 10, 1979

Related U.S. Application Data

[60] Continuation of Ser. No. 831,736, Sep. 9, 1977, abandoned, which is a division of Ser. No. 617,955, Sep. 29, 1975, Pat. No. 4,061,886.

[51] Int. Cl.³ .............................................. H04M 1/50
[52] U.S. Cl. .............................................. 179/84 VF
[58] Field of Search ................. 179/81 R, 84 R, 84 T, 179/84 VF, 90 K

[56] References Cited

U.S. PATENT DOCUMENTS

| | | | |
|---|---|---|---|
| 3,064,084 | 11/1962 | Meacham | 179/90 K |
| 3,284,577 | 11/1966 | Burns et al. | 179/90 K |
| 3,959,604 | 5/1976 | Newson et al. | 179/84 VF |

Primary Examiner—Bernard Konick
Assistant Examiner—J. A. Popek

[57] ABSTRACT

A dual-tone multiple frequency signal generator is provided for use with telecommunications systems, data transfer systems and other applications. The tone encoding system utilizes MOS/LSI integrated circuitry on a single chip powered directly by telephone line voltages. An electronic keyboard circuit provides synchronized pulses to decode single-pole, single-throw keyboard switches by row and column. A crystal-controlled oscillator generates a reference frequency which is divided according to the row and column of an activated keyboard switch to obtain two pulse signals having frequencies representative of the activated switch. The outputs of the divider circuitry are fed to a programmed logic array which generates two digitally coded signals each representing a sinusoidal waveform. A digital-to-analog ladder network converts the digitally coded signals to continuous sine waves, and an operational amplifier combines the sinusoidal waveforms to provide a dual-tone output. The integrated circuitry also utilizes electronic switches for the common functions of tone transmission, including applying power to the oscillator, disconnecting the audio transmitter and attenuating the input to the receiver. Complementary-symmetry, metal-oxide semi-conductor elements implement the circuitry design with bi-polar transistors on the same chip performing some of the common function switching.

18 Claims, 12 Drawing Figures

INTEGRATED CIRCUIT CHIP TELEPHONE COMMUNICATION SYSTEM

This is a continuation, of application Ser. No. 831,736, filed Sept. 9, 1977, now abandoned, which is a divisional of application Ser. No. 617,955, now U.S. Pat. No. 4,061,886.

BACKGROUND OF THE INVENTION

This invention relates to tone encoding systems for communications networks. More particularly, the invention concerns a dual-tone multiple frequency signal generator for keyboard input tones to standard telephone systems.

Conventional tone encoding systems usually consist of two major parts—a keyboard assembly with its associated decoding circuitry, and an oscillator and accompanying signal generating circuitry. The keyboard is arranged in rows and columns of pushbuttons having mechanical contacts. These contacts normally have double-pole, double-throw switches to establish electrical contact between the row and column of the selected key. A mechanical common switch, normally a three-pole, double-throw type, is connected to each of the push keys. This common switch is actuated whenever any key is depressed to apply power to the oscillator, disconnect the carbon audio transmitter, and add an attenuator or muting resistor in series with the earpiece.

Keyboards of this type are mechanically complex and difficult to manufacture. Numerous moving parts are required and many contacts must be soldered by hand. This configuration also reduces the reliability of the keyboard system and provides a large, bulky unit.

The standard oscillator portion of the encoding system includes a bias circuit and a protective circuit. The protective circuitry usually includes a combination of varistors, diodes and zener diodes. The bias circuitry varies with the type of oscillator and may be at least partially combined with the protective circuitry. The oscillator should be capable of generating two sinusoidal tones simultaneously, each having a low harmonic distortion and each being very accurate with respect to absolute frequency.

One type of conventional oscillator employs a single transistor and transformer coupling with selectable dual tank circuits. Two coils with four windings each are used to provide the frequencies selected by the keyboard. Because of the high degree of accuracy needed in the output frequencies, expensive high quality windings are required for the tank circuits. These circuits require initial fine tuning by hand and frequent retuning in order to maintain accuracy. This type of circuit is relatively expensive to manufacture and maintain because of its vulnerability to aging, temperature, humidity and shock. The system is also bulky and unwieldly.

Another system of the prior art utilizes active amplifiers and a passive feedback network such as a double-T or bridged-T circuit. Systems of this type are smaller and more reliable than some previous systems, but still require precise frequency adjustment of the passive components thus increasing the expense of manufacturing and maintenance.

SUMMARY OF THE INVENTION

The present invention is concerned with an improved electronic signal generating system and method for providing a dual-tone output. The system utilizes MOS-LSI integrated circuitry powered by standard line voltage. A keyboard assembly preferably uses single-pole, single-throw key switches. The keyboard is decoded by synchronized timing circuitry to provide keyboard input signals representative of the actuated keys. A reference frequency signal, generated by a crystal controlled oscillator, is divided in response to the keyboard input signals to obtain digital pulses having a frequency representative of the row and column of an actuated key. These digital signals are converted by a programmed logic array to binary words approximating sine waves. A conventional digital to analog converter translates the binary words to a sinusoidal output waveform.

The common key functions such as powering up the circuitry, switching out the transmitter and connecting muting resistance into the receiver circuit are provided electronically as part of the chip of integrated circuitry. Complementary-symmetry, metal-oxide, semi-conductor (CMOS) elements are utilized to provide high-frequency, low-voltage operation. A number of bipolar transistors are included in the integrated circuitry to handle the high current requirements for the common functions and to drive the low-impedence telephone lines.

In accordance with another aspect of the present invention, a signal generator provides an output signal representative of a keyboard selection. Keyboard means are provided having actuable keys on the keyboard and means for generating pulses representative of an actuated key. A reference oscillator generates a reference frequency signal which is modified in response to the pulses from the keyboard to provide a digital signal representative of the actuated key. Conversion means generate a sinusoidal output signal in response to the digital signal.

In accordance with another aspect of the present invention, a signal generating system is provided for producing a dual-tone, multiple frequency signal. A keyboard includes a plurality of actuable selector keys with a scan signal generator for sequentially directing timed pulses to the inputs of the keys. First and second decoder circuits provide a pair of pulse signal trains responsive to the timed pulses and representative of the row and column of a selected key. A reference oscillator generates a reference frequency signal which is divided by counting circuitry in response to the pair of pulse signal trains to produce a pair of digital signals having frequencies which are multiples of standard telephone output frequencies. Programmed logic array means convert the digital signals to binary coded words which represent sinusoidal waveforms having standard telephone output frequencies. Finally, a conventional digital-to-analog converter converts the binary words to sinusoidal signals which are combined to generate the dual-tone multiple frequency output signal.

In accordance with a further important aspect of the present invention, a signal generator provides an output signal in response to an input signal from one of a plurality of monitored sources. Actuator means are in communication with each of the sources and generate timed pulses representative of the location of the sources relative to each other. A reference means generates a standard reference signal which is modified in response to the timed pulses to generate a digital signal. Programmed means convert the digital signal to a digitally coded signal which is then converted to a sinusoidal analog signal for the output.

From the foregoing, it is apparent that the present invention provides several advantages over the prior art. The system can operate directly from the telephone line voltage with no external power supply necessary. The use of a crystal-controlled oscillator provides a steady reference frequency signal without requiring frequent tuning. The division of the frequency signal by selected integer factors provides the highly accurate tones necessary to interface with a standard telephone system. The keyboard synchronized decoder circuitry enables the use of a low-profile simple keyboard assembly having single-pole, single-throw switches requiring considerably less expense and maintenance. The use of a programmed logic array provides a compact means of converting the digital pulse trains to digitally stepped binary words which can then be converted to sinusoidal output tones without requiring complicated filtering networks. Using MOS-LSI integrated circuitry, the entire system except for the crystal of the reference oscillator is included on a single chip, thereby providing a compact low-maintenance package capable of operating at high frequencies and low voltage. By including the common key functions on the chip, the size and maintenance requirements of the system are further reduced.

Although the present invention is contemplated primarily for use in the input portion of standard telephone operating systems, the features of the invention are broad enough to be included in burglar alarms, electronic combination locks, low-speed modems for data transfer, such as credit verification systems, and remote control/signalling systems such as VHF-UHF, autopatch repeaters and control signalling.

DESCRIPTION OF THE DRAWINGS

A more complete understanding of the advantages, structure and operation of the present invention may be had by referring to the following detailed description when taken in conjunction with the accompanying drawings, wherein.

DESCRIPTION OF THE PREFERRED EMBODIMENT

Figure 1:
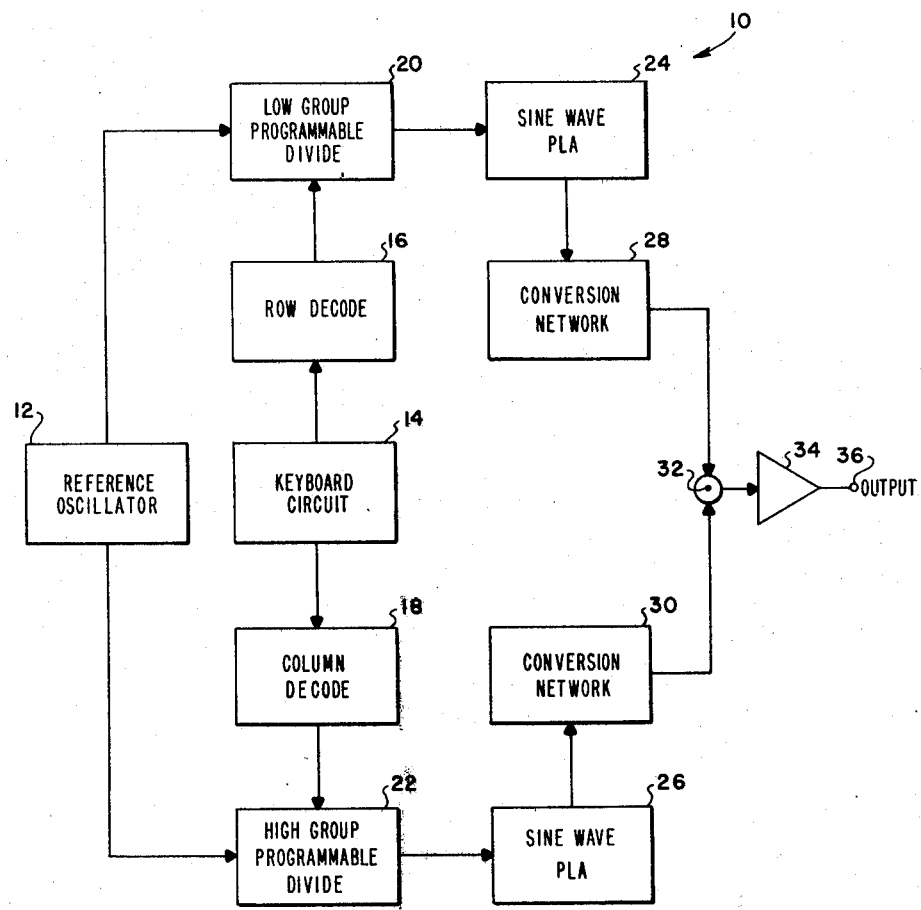
FIG. 1 is a simplified block diagram showing one embodiment of the present invention.

Referring now to FIG. 1, a simplified block diagram of a signal generator system in accordance with one embodiment of the present invention is indicated generally by the reference numeral 10. With the exception of the crystal of reference oscillator 12, signal generator system 10 is fabricated as a single integrated circuit using primarily CMOS (complementary-symmetry, metal-oxide semiconductor) field effect transistor technology. System 10 generates a dual-tone multiple frequency waveform output of low harmonic distortion which is suitable for telephone signalling or other applications. It can operate from telephone lines or a fixed DC supply and is designed for economy and compactness.

The input to system 10 is provided by a keyboard circuit 14 having actuable keys arranged in rows and columns. The outputs of keyboard circuit 14 feed to a row decode circuit 16 and a column decode circuit 18 which electronically sense the row and column of an actuated key. Timed pulses are generated by circuits 16 and 18 which are fed respectively to a low group programmable divide circuit 20 and a high group programmable divide circuit 22. The frequency of the reference signal from reference oscillator 12 is divided by circuits 20 and 22 to provide output digital signals having frequencies which are representative of the row and column of the selected key and which are multiples of standard frequencies for conventional communication systems. These digital signals are fed to sine wave programmed logic arrays (PLA) 24 and 26 which convert the digital frequency signals from circuits 20 and 22, respectively, to digitally coded words having binary values representing different levels of the amplitude of sine waves having standard communication frequencies. These coded words are then fed into conversion networks 28 and 30 which generate analog sinusoidal waveforms at the frequencies indicated. The sine waves are then combined by circuit 32 and fed to an operational amplifier 34 for current to voltage conversion. The output signal 36 of system 10 is a dual-tone sinusoidal signal having frequencies which are compatible to interface with standard communication systems. The frequencies of the output signal will vary with the row and column of the selected key so that a unique output signal is provided for each actuated key.

Figure 2:
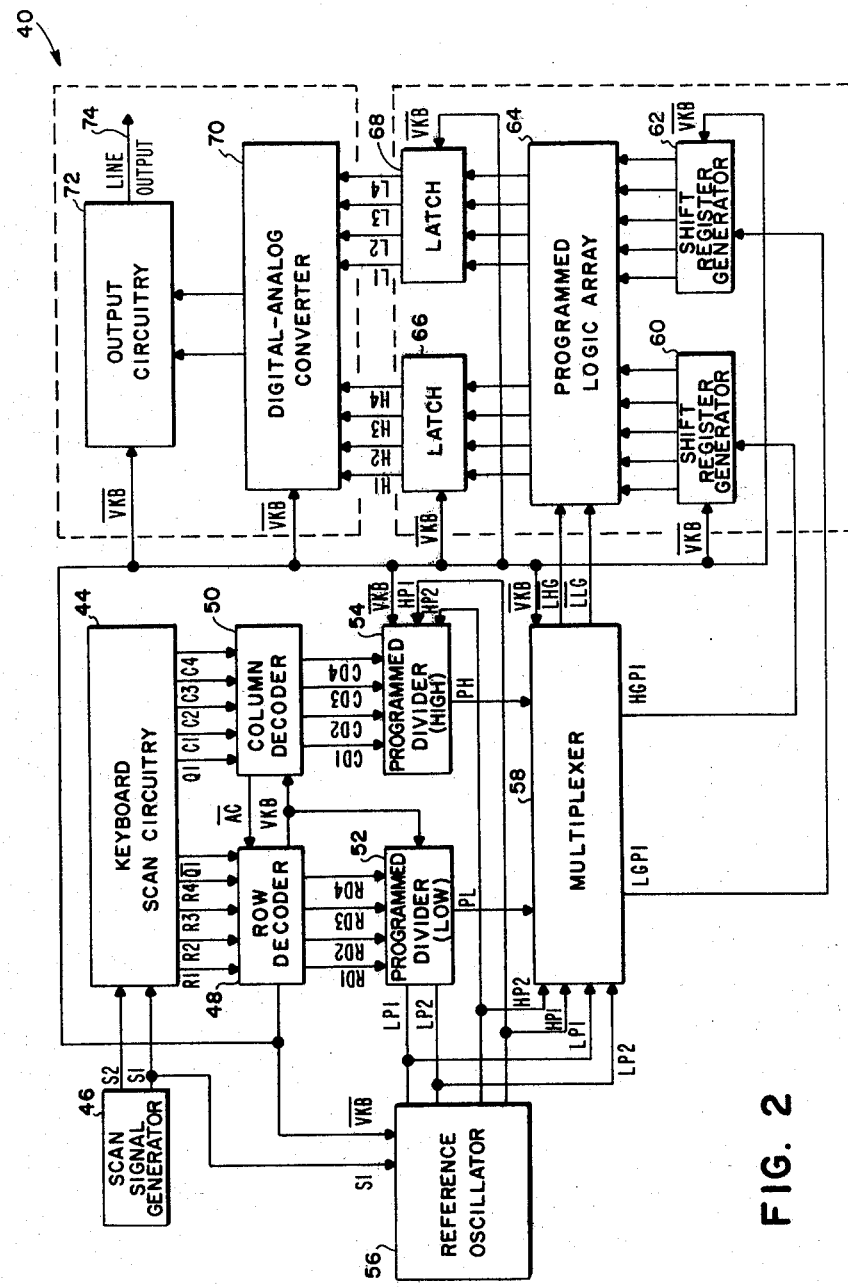
FIG. 2 is a block diagram of another embodiment of the present invention.

In FIG. 2, a detailed block diagram of another embodiment is shown. A telephone tone generator system 40 is shown for providing a multiple frequency keyboard output signal to conventional telephone circuitry. The system 40 is preferably a monolithic integrated circuit which is fabricated with the complementary-symmetry MOS process. An inexpensive crystal reference oscillator operates at 3.58 megahertz to provide the reference frequency signal for the system. The keyboard entries come from sixteen keys arranged in four rows and four columns and are monitored by row and column decode circuits which select the proper digital divider factors for reducing the reference frequency. In response to selection of a particular key, the reference frequency is divided to two of eight different sinusoidal frequencies which represent the row and column of the selected key. These frequencies are then mixed together to provide standard output tones suitable for dual-tone multiple frequency telephone dialing. System 40 is used primarily in telephone applications, preferably powered directly from the telephone lines and sending the output tones back differentially across the telephone lines. System 40 may be also used with a fixed DC supply in which case the audio output tones are provided at the output amplifier. The key inputs may be delivered by a standard double-pole, double-throw keyboard or a simple single-pole, single-throw keyboard. Preferably the common key functions such as switching out the transmitter and switching in muting resistance are included in the integrated circuitry.

With this brief overview, the configuration and function of the system shown in FIG. 2 and each of its components shown in FIGS. 3-12, will be discussed, followed by a general description of the operation of the system. Although not shown in FIG. 2, the major elements of telephone tone generator system 40 are preferably powered by telephone line inputs operating at standard voltage. These voltage inputs are shown as V+ and V− in the following figures. The data input is provided by keyboard scan circuitry 44 having sixteen keys arranged in four rows and four columns. A scan signal generator 46 provides scanning signals S1 and S2 to keyboard scan circuitry 44 for monitoring the rows and columns of push button keys.

The row outputs of circuitry 44, R1-R4, are fed to a row decoder 48 together with a reference signal $\overline{Q1}$. Likewise, the four column signals C1-C4 are input to a column decoder 50 along with a reference signal Q1. Row decoder 48 has four digital outputs RD1-RD4 connecting to a programmed divider (low) 52. Similarly, the four column digital output CD1-CD4 extend from column decoder 50 to a programmed divider (high) 54. Row decoder 48 also provides a control signal VKB to column decoder 50 and several other components in system 40 to signal that a valid keyboard entry has been made. Column decoder 50 generates a control signal $\overline{AC}$ which is input to row decoder 48 to indicate the presence of a signal in one of the columns. Reference oscillator 56 provides high and low frequency outputs to be divided by program dividers 52 and 54 in response to the outputs of row and column decoders 48 and 50. The low frequency output signal LP1 and its inverted complement LP2 are fed to program divider (low) 52 together with the control signal VKB. The high frequency input signal HP1 and its complement HP2 are inputted to program divider (high) 54 along with control signal $\overline{VKB}$.

In order to reduce the size of the circuitry, a multiplexer 58 receives the outputs PL and PH from programmed dividers 52 and 54 respectively and gates them in modified form alternately to one programmed logic array 64. The high and low frequency signals HP1, HP2, LP1 and LP2 from reference oscillator 56 are also fed to multiplexer 58 to generate timing pulses LGP1 and HGP1 for clocking shift register generators 60 and 62. The control signal $\overline{VKB}$ is also fed to both generators 60 and 62.

Shift register generators 60 and 62 are each five stage counters having outputs which are alternately gated into the programmed logic array (PLA) 64 by two control signals $\overline{LHG}$ and $\overline{LLG}$ from multiplexer 58. PLA 64 provides binary word outputs which are stepped in value to represent sinusoidal amplitudes and which are stored temporarily in latches 66 and 68. The high latch outputs H1-H4 and the low latch outputs L1-L4 are directed to a digital-analog converter 70, preferably including an R-2R ladder network. The two sinusoidal frequency output signals from converter 70 are fed to output circuitry 72 to be combined and transmitted on line output 74. The control signal $\overline{VKB}$ is also inputted to latches 66 and 68, digital-analog converter 70 and output circuitry 72 for synchronized actuation of the circuits when the keyboard is activated. Multiplexer 58 may be eliminated from system 40 by adding a second programmed logic array similar to PLA 64. One PLA would be connected between shift register 60 and latch 66, and the other would process the output of shift register 62 for the latch 68 input.

Figure 3:
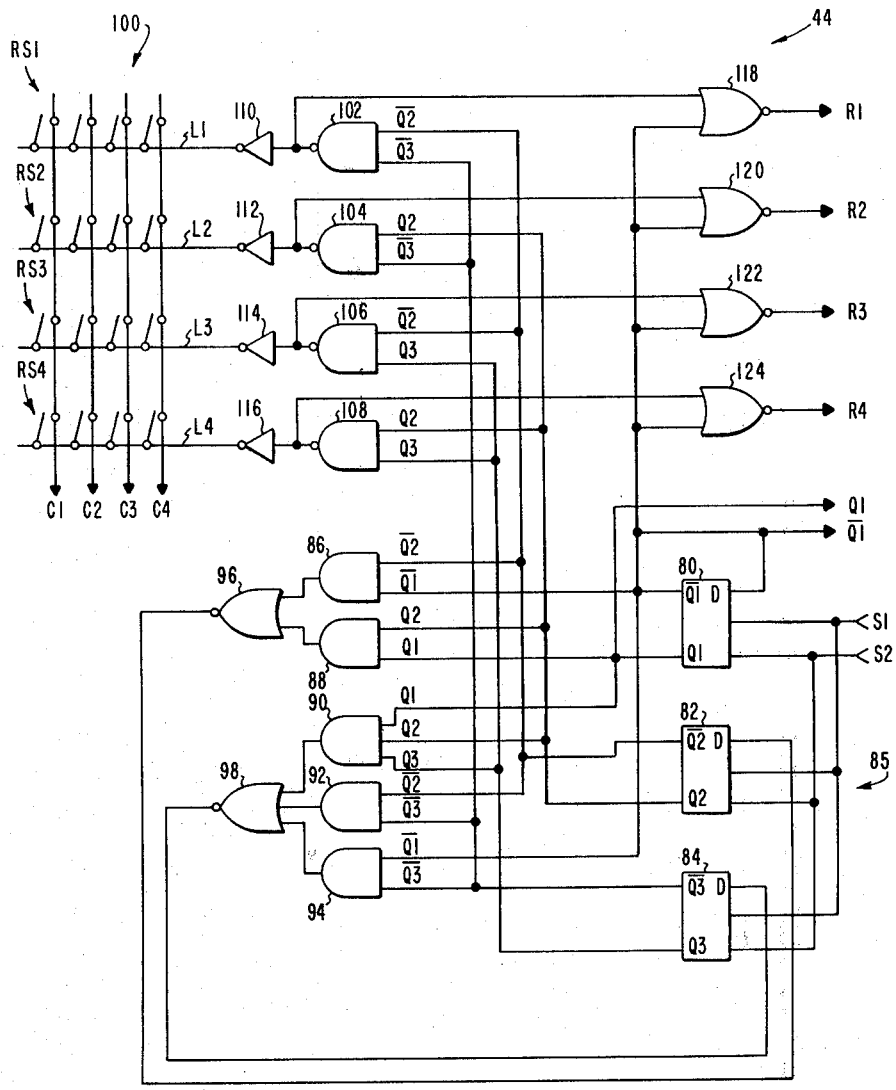
FIG. 3 is a circuit diagram of the keyboard and scan circuitry of the system shown in FIG. 2.

The keyboard scan circuitry 44 is shown in greater detail in FIG. 3. The scan circuitry includes three latches 80, 82 and 84 which are preferably D-input type clocked flip-flop logic gates having two phase control inputs and Q and $\overline{Q}$ outputs. The latches are essentially one cycle delay circuits with the input signal at the D-input appearing one cycle later at the Q output. The scan signals S1 and S2 are provided as control inputs to the latches by a scan signal generator shown in FIG. 6 and discussed later.

The three latches 80, 82 and 84 operate as a three-stage counter 85 sequencing through an eight step cycle with latch 80 representing the least significant bit and latch 84 counting the most significant bit. The outputs of latch 80 are designated Q1 and $\overline{Q1}$, latch 82 Q2 and $\overline{Q2}$ and latch 84 Q3 and $\overline{Q3}$. The counting sequence of the three latches in terms of their Q outputs is given in Table I:

TABLE I

| Count | Q1 | Q2 | Q3 | L1 | L2 | L3 | L4 |
|---|---|---|---|---|---|---|---|
| 1 | 0 | 0 | 0 | 1 | 0 | 0 | 0 |
| 2 | 1 | 0 | 0 | 1 | 0 | 0 | 0 |
| 3 | 0 | 1 | 0 | 0 | 1 | 0 | 0 |
| 4 | 1 | 1 | 0 | 0 | 1 | 0 | 0 |
| 5 | 0 | 0 | 1 | 0 | 0 | 1 | 0 |
| 6 | 1 | 0 | 1 | 0 | 0 | 1 | 0 |
| 7 | 0 | 1 | 1 | 0 | 0 | 0 | 1 |
| 8 | 1 | 1 | 1 | 0 | 0 | 0 | 1 |

It is understood that the terms "positive pulse" and "1 bit" as well as "negative pulse" and "0 bit" are used interchangeably throughout this specification. The corresponding designations "true" and "false" may also be used.

The counting sequence of Table I can be readily seen by reference to the interrelationship of latches 80, 82 and 84 with AND gates 86 to 94 and NOR gates 96 and 98 as shown in FIG. 3. The D input of latch 80 is connected directly to the $\overline{Q1}$ output of the same latch. Thus latch 80 will change states with each count since its negative output state is connected to its input.

The outputs of latches 80, 82 and 84 feed into a bank of AND gates 86–94 and NOR gates 96 and 98 which have outputs to the D inputs of latches 82 and 84 respectively. AND gate 86 has Q1 and Q2 inputs and AND gate 88 has $\overline{Q1}$ and $\overline{Q2}$ inputs. The outputs of these two gates are fed to NOR gate 96 which directs its input back to the D input of latch 82. Gates 86, 88 and 96 effectively perform an exclusive OR function on latch outputs $\overline{Q1}$ and $\overline{Q2}$. Thus referring to Table I, a "1" bit is generated for the D input of latch 82 during the second and third counts of Table I. This input shows up as a Q2 output during the third and fourth counts.

AND gate 90 has Q1, Q2 and Q3 inputs; AND gate 92 has $\overline{Q2}$ and $\overline{Q3}$ inputs; and $\overline{Q1}$ and $\overline{Q3}$ feed into AND gate 94. The outputs of AND gates 90, 92 and 94 are directed to NOR gate 98 which feeds to the D input of latch 84. As can be seen from reviewing the functions of gates 90, 92, 94 and 98, NOR gate 98 presents a "1" bit to the D input of latch 84 only during steps 4 through 7 of Table I. These inputs are reflected in the Q3 output during steps 5 through 8 of Table I.

The Q outputs of latches 82 and 84 are fed to the keyboard 100 in a timed sequence through NAND gates 102-108 and inverters 110-116. NAND gate 102 has inputs $\overline{Q2}$ and $\overline{Q3}$ and an output which feeds through inverter 110 on line L1 to the first row of keyboard switches RS1. Similarly, NAND gate 104 has inputs $\overline{Q2}$ and $\overline{Q3}$ and an output which is inverted by inverter 112 and fed to switches RS2 on line L2. NAND gate 106 has inputs Q2 and $\overline{Q3}$ and outputs through inverter 116 along line L4 to switches RS4. The sixteen switches RS1-RS4 are shown as single-throw, single-pole switches having interconnected column poles to form four column lines with outputs C1-C4 respectively.

As can be seen from Table I, a positive pulse appears on line L1 only during the first and second count of the three-stage counter 85. The pulse next appears on line L2 during the 3rd and 4th counts, on line L3 during the 5th and 6th counts, and finally on line L4 during the 7th and 8th counts of the sequence. Thus, each of the four lines L1-L4 are sequentially monitored with two-count scan pulses to determine whether a switch has been closed.

The outputs of NAND gates 102-108 are also inputted to four NOR gates 118-124 respectively. The $\overline{Q1}$ output of latch 80 is also directed to each of the NOR gates 118-124. The outputs of R1-R4 of these gates provide input signals to the row decoder shown in FIG. 4. NOR gates 118-124 function to stabilize the sequential row scan pulses directed to the row decoder by cutting each pulse length in half. Thus, line R1 carries a pulse only during the second count in Table I. Similarly, lines R2, R3 and R4 carry counts only during the fourth, sixth and eighth counts of the table, respectively.

Figure 4:
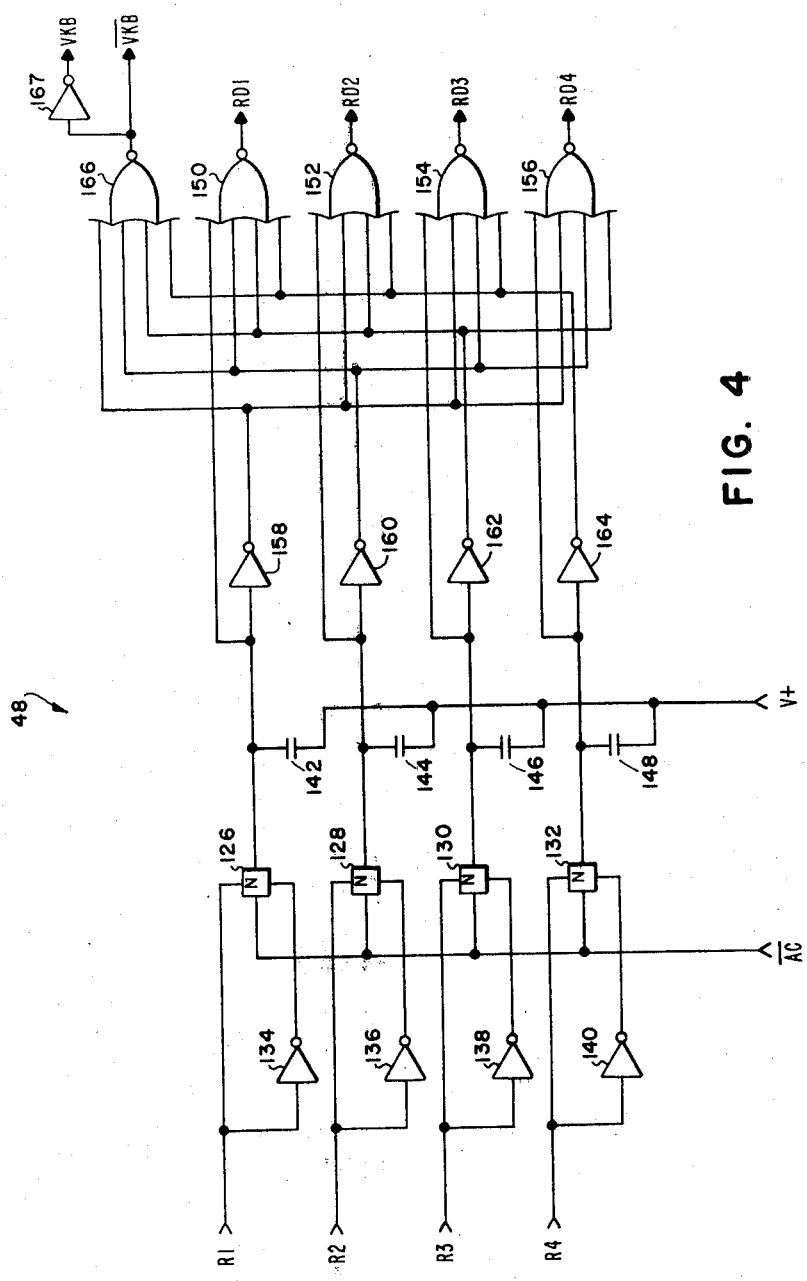
FIG. 4 is a circuit diagram of the row decoder of the system of FIG. 2.

With reference now to FIG. 4, the row decoder 48 is shown in greater detail. The R1-R4 outputs of the keyboard scan circuitry 44 shown in FIG. 3 are fed to the n-channel inputs of four transmission gates 126-132 respectively. Each of the R1-R4 inputs are also inverted by one of inverters 134-140, the outputs of which are fed to the p-channel control gates of transmission gates 126-132. A control signal $\overline{AC}$ is applied to each of the inputs of transmission gates 126-132, representing a negative pulse which is generated when a positive pulse appears on any of the keyboard column outputs and will be discussed more fully in conjunction with the discussion of the column decoder in FIG. 5. Transmission gate 126 provides a negative pulse output when the R1 control input goes positive and the $\overline{AC}$ input goes negative, that is when a positive pulse appears on line L1 into keyboard 100 and a positive pulse appears at one of the column outputs C1-C4 indicating that one of the switches on keyboard 100 is closed. Similarly, transmission gates 128-132 yield negative pulses out when a positive pulse appears on inputs R2-R4 respectively, and a negative pulse is applied on the $\overline{AC}$ input.

The outputs of transmission gates 126-132 are each connected between one of capacitors 142-148 respectively, and positive line voltage V+. Capacitors 142-148 function as temporary memories to hold the charges from pulse outputs of gates 126-132.

Transmission gates 126-132 also output directly to a bank of four-input NOR gates 150-156, respectively. The output of transmission gate 126 is also directed to an inverter 158 the output of which is fed to NOR gates 152, 154, and 156. Similarly, an inverter 160 receives the output of gate 128 and inputs to NOR gates 150, 154 and 156. The output of transmission gate 130 is fed to an inverter 162 which has an output directed to NOR gates 150, 152 and 156. Finally, an inverter 164 receives the output of transmission gate 132 and in turn feeds to NOR gates 150, 152 and 154.

As can be seen by analyzing the inputs to NOR gate 150, a positive pulse will appear at the outputs RD1 only when there is a positive pulse on the R1 input and negative pulses on the R2-R4 inputs. Similarly, a positive pulse appears at the output RD2 of NOR gate 152 only when the input R2 is positive and the other inputs R1, R3 and R4 are negative. A similar analysis is apparent with respect to the other NOR gates 154 and 156. Thus, a positive pulse appears at the outputs of each of NOR gates 150-156 when a positive pulse is applied to, and only to, its respective keyboard row and the pulse is returned along one of the keyboard columns indicating that a switch is closed.

The outputs of inverters 158-164 are also fed to a four input NOR gate 166 which in turn feeds to an inverter 167. The outputs of inverter 167 and NOR gate 166 are designated as VKB AND $\overline{VKB}$ respectively. Both outputs are control signals which are applied to various elements in the circuitry as will be discussed later. The VKB (valid keyboard) signal indicates that one and only one of the rows has been activated, and conversely, the $\overline{VKB}$ signal indicates that none or more than one of the keyboard rows have received activating pulses.

Figure 5:
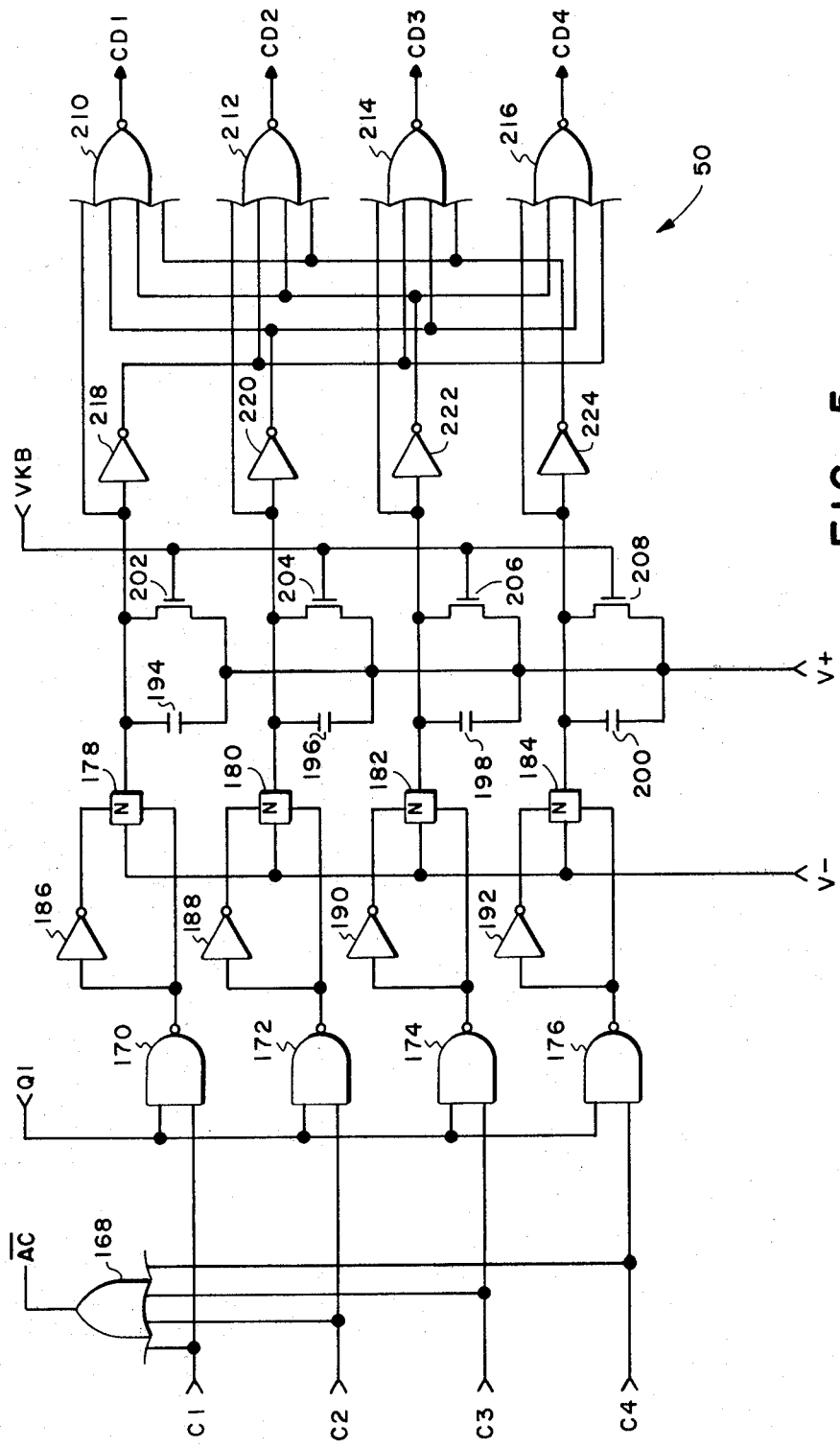
FIG. 5 is a circuit diagram of the column decoder of the system of FIG. 2.

With reference now to FIG. 5, the circuit diagram for the column decoder 50 is shown. The C1-C4 outputs from the columns of keyboard 100 as shown in FIG. 3 comprise inputs to the column decoder 50. Each of the inputs C1-C4 also feed to a four input OR gate 168 to generate the $\overline{AC}$ control output previously mentioned. The C1-C4 inputs also feed to NAND gates 170-176 respectively, each having a second common input Q1 from latch 80 shown in FIG. 3. NAND gates 170-176 function similarly to the NOR gates 118-124 of FIG. 3 in stabilizing and dividing in half the C1-C4 pulse inputs. The outputs of NAND gates 170-176 are fed to the p-channel control inputs of transmission gates 178-184. The same outputs are also passed through inverters 186-192 respectively, and applied to the n-channel control inputs of transmission gates 178-184, respectively. A negative line voltage V— is applied to the input of each of transmission gates 178-184 so that a negative pulse is transmitted on the outputs of these gates when a corresponding positive column pulse input is received.

Capacitors 194-200 are connected between the outputs of transmission gates 178-184 respectively and positive line voltage V+. P-type MOS transistors 202-208 are also connected between the outputs of transmission gates 178-184 respectively, and positive line voltage. The VKB control signal is applied to the gates of each of transistors 202-208.

The outputs of transmission gates 178-184 are also applied directly to a bank of four-input NOR gates 210-216, respectively, and to the inputs of inverters 218-224 respectively. The output of inverter 218 is applied to NOR gates 212, 214 and 216. Similarly, the output of inverter 220 is applied to the inputs of NOR gates 210, 214 and 216. The output of inverter 224 is fed to NOR gates 210, 212 and 214.

Transistors 202-208 are normally on in the absence of a VKB positive pulse, thereby discharging capacitors 194-200 and blocking the outputs of transmission gates 178-184. When a positive VKB pulse is received, transistors 202-208 are turned off allowing the capacitors 194-200 to charge and the outputs of transmission gates 178-184 to be applied to NOR gates 210-216 and inverters 218-224. It is therefore apparent that the outputs CD1-CD4 of NOR gates 210-216 are presented with positive pulses only when a pulse appears on the respective column input C1-C4 and a VKB signal is received indicating that a positive pulse signal has been applied to one keyboard row.

Figure 6:
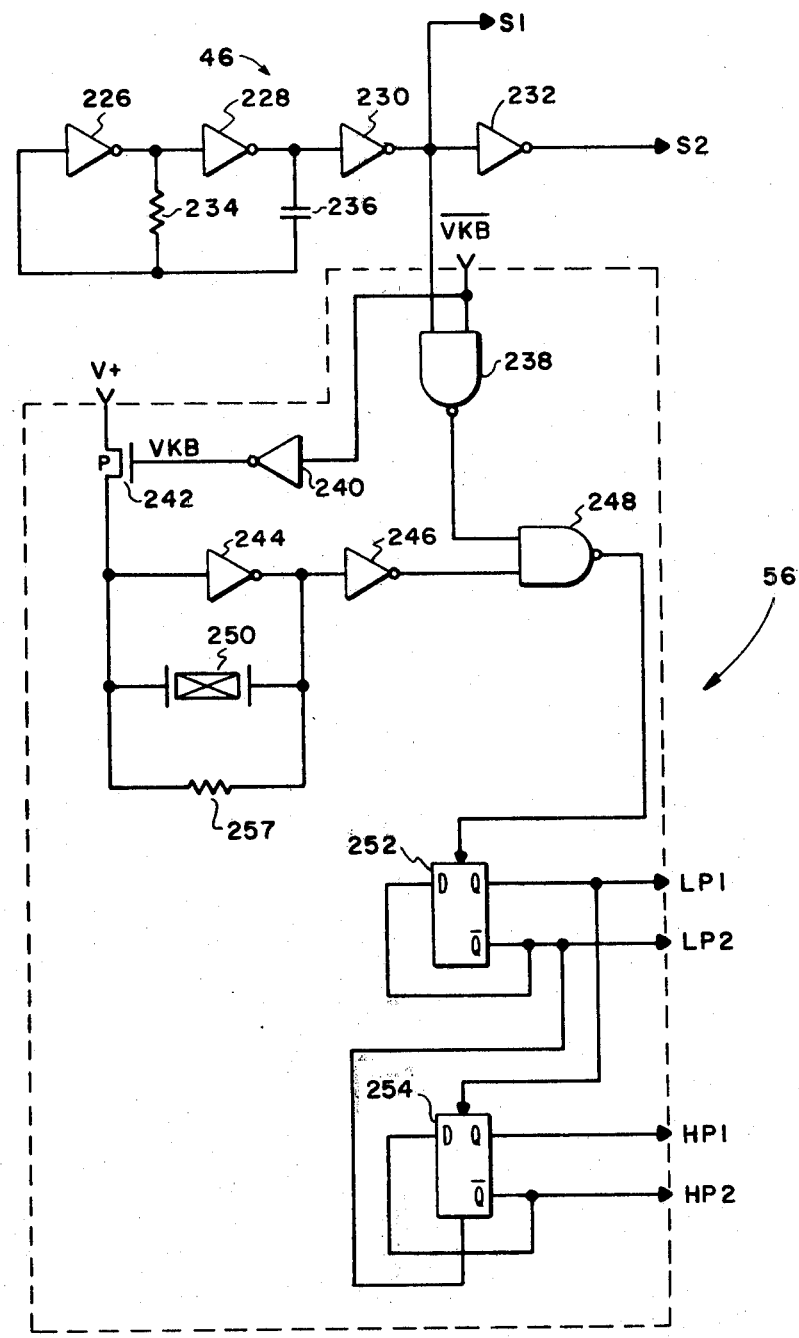
FIG. 6 is a circuit diagram of the scan signal generator and reference oscillator of the system of FIG. 2.

Referring now to FIG. 6, the scan signal generator 46 and the reference oscillator 56 are shown. Two inverters 226 and 228 are serially connected, the output of inverter 226 feeding back through a resistor 234 to its input. The output of inverter 228 is also directed through a capacitor 236 to the input of inverter 226. Each inverter described in this specification is preferably a p-channel, n-channel, push-pull amplifier powered by line voltage (not shown) and having no feedback except for capacitive coupling. Inverters 226 and 228 together with resistor 234 and capacitor 236 form a free-running R-C scan oscillator, preferably operating at approximately 100 kilohertz frequency. The oscillator output feeds through inverter 230 to obtain control signal S1 which is inputted to inverter 232 to produce control signal S2. Control signals S1 and S2 are timing signals which are used in the keyboard scan circuitry to control the clock rate for the three-stage counter 85 using latches 80, 82 and 84.

Control signal S1 is also an input for reference oscillator 56, feeding to one input of a NAND gate 238. The other input is supplied through an inverter 240 to provide a VKB input to the gate of a p-channel MOS transistor 242. Transistor 242 is connected between a positive line voltage V+ and an inverter 244 having an output which is fed through an inverter 246 to one input of a NAND gate 248. The other input of NAND gate 248 is supplied by the output of NAND gate 238. An oscillator circuit comprises an off-chip crystal 250 and a resistor 251 connected in parallel across the input and output of inverter 244, providing a reference frequency output for the rest of the circuit. Crystal 250 is preferably a high-precision inexpensive crystal which operates at a 3.58 megahertz frequency with resistor 251 preferably at a twelve megaohm value.

The output of NAND gate 248 is applied to the timing input of a static D-type power flip-flop 252 having standard Q and $\overline{Q}$ outputs. The $\overline{Q}$ output feeds back to the D input of flip-flop 252 causing the latch to change state with each count. The Q and $\overline{Q}$ outputs of flip-flop 252 also provide the two control inputs for a dynamic power flip-flop 254 having standard Q and $\overline{Q}$ outputs. The $\overline{Q}$ output of flip-flop 254 feeds back to its D input to insure a change of state with each count. Although not shown, flip-flops 252 and 254 each include a front end power drive circuit to amplify the output signals in order to provide timing pulses for the rest of the system. Flip-flop 252 is effectively a divide-by-two circuit which divides the oscillator input frequency to 1.79 megahertz at the Q outputs, designated LP1 and LP2. Similarly, flip-flop 254 constitutes a divide-by-two circuit which further divides the 1.79 megahertz frequency from flip-flop 252 to a 895 kilohertz frequency signal at the Q outputs of flip-flop 254, designated HP1 and HP2.

When none of the keys on the keyboard have been depressed, the system is in standby mode with the crystal oscillator circuit off. With none of the keys depressed, the negative VKB input turns transistor 242 on impressing the V+ voltage on the crystal 250 to clamp it off and applying a positive signal at the output of inverter 246. In this mode, the $\overline{VKB}$ input to NAND gate 238 is positive, allowing the S1 input to control NAND gates 238 and 248. Thus, the scanner frequency feeds through two flip-flops 252 and 254 and on to the rest of the system.

When a key on the keyboard is activated, the VKB signal goes positive turning transistor 242 off and activating crystal 250 to oscillate with resistor 251. At the same time, the $\overline{VKB}$ input to NAND gate 238 turns negative, thereby presenting a positive input to NAND gate 248 so that the gate acts as an inverter, passing through the reference frequency from the crystal oscillator. Thus, with a key on the keyboard depressed, the reference oscillator 56 is activated, applying the reference frequence to the rest of the system. When no key is activated, the system is in standby mode with the reference oscillator turned off and the lower scanner frequency applied to the system to reduce power usage.

Figure 7:
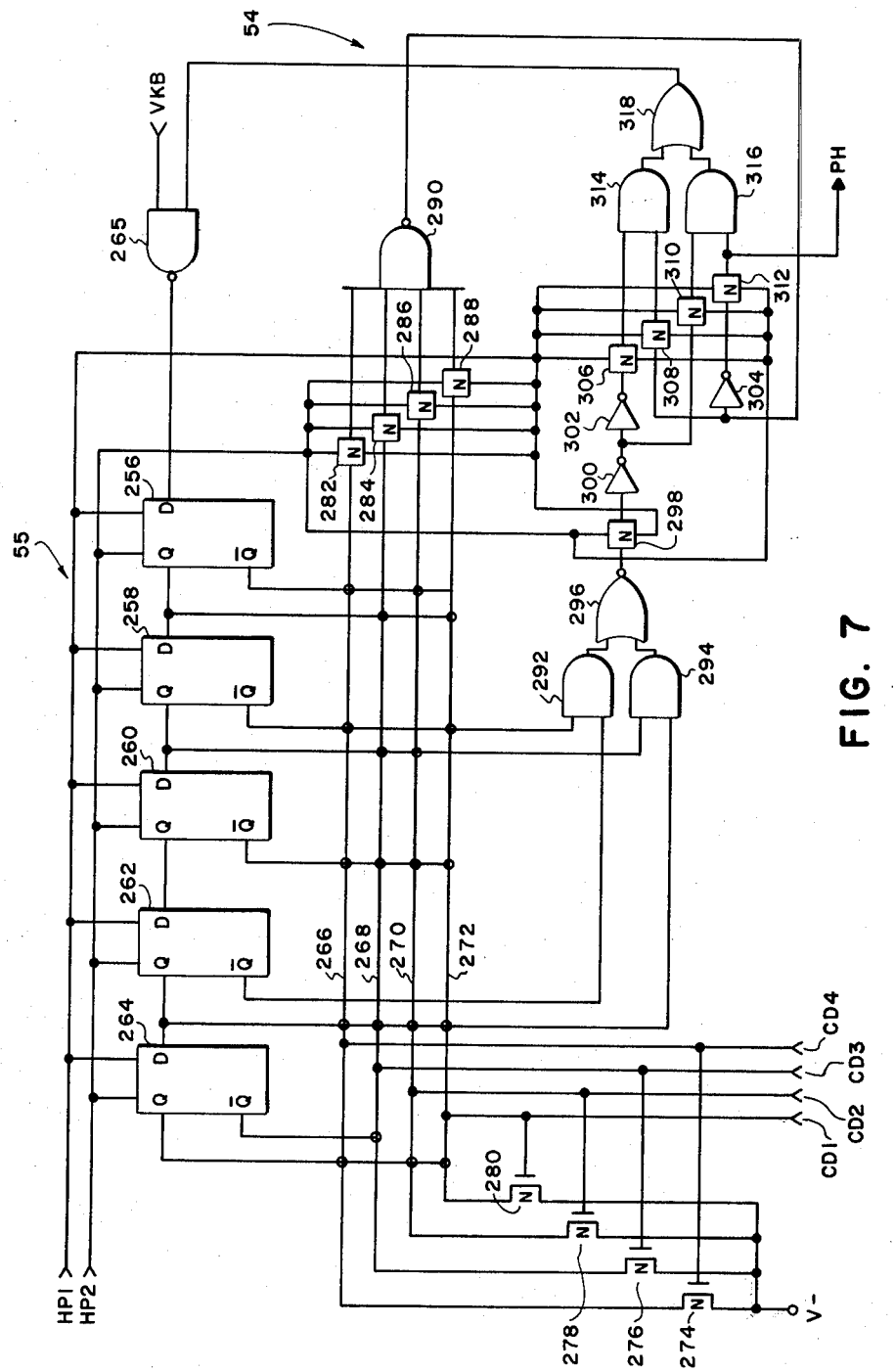
FIGS. 7 and 8 are circuit diagrams of the programmed divider circuitry of the system of FIG. 2.

Reference is now made to FIG. 7 wherein the programmed divider (high) 54 is shown in circuit diagram form. A five-stage shift register generator counter 55 is disclosed comprising five serially connected D-type latches 256-264 and feedback circuitry. The control signals HP1 and HP2 from the reference oscillator shown in FIG. 6 are fed to the two control inputs for each of latches 256-264. Except for the last stage, the Q outputs of each stage are connected to the D inputs of the next serially connected stage. The first stage latch 256 receives its D input from a NAND gate 265, which in turn has a first input VKB and a second input to be described later. When VKB is negative during the standby mode, the NAND gate 265 prevents a signal passing to latch 256. When a key has been activated, VKB goes positive and whatever is presented on the second input is directed to latch 256.

The Q and $\overline{Q}$ outputs of latches 256-264 form a feedback matrix by joining four intersecting common lines 266-272 at predetermined locations. The symbol "O" at the predetermined junctions between the outputs of latches 256-264 and lines 266-272 represents the presence of a conventional complementary-symmetry MOS transistor which is pulsed on during counting or shifting to transmit data and otherwise remains in an off state. This configuration is more fully discussed in connection with PLA 64 in FIG. 10. The Q output of latch 256 is connected to lines 268 and 272, and the $\overline{Q}$ output is connected to lines 266 and 270. For latch 258, the Q output intersects lines 268 and 270 and the $\overline{Q}$ output is joined to lines 266 and 272. The Q output of latch 260 is not connected to any lines, while the $\overline{Q}$ output is connected to all four lines 266-272. The Q output of latch 262 is connected to all four lines 266-272 and the $\overline{Q}$ output is not joined to any of the lines. Finally, the Q output of latch 264 is connected to lines 266, 270 and 272 and the $\overline{Q}$ output is connected to line 268. Four n-channel MOS transistors 274-280 are connected between lines 266-272 respectively and negative line voltage V−. The gates of transistors 274-280 are connected respectively to the CD1-CD4 outputs of the column decoder shown in FIG. 5. The CD1-CD4 signals are also connected respectively to lines 272, 270, 268 and 266.

Lines 266-272 feed to the inputs of transmission gates 282-288, respectively, which are controlled by input signals HP1 and HP2. The outputs of transmission gates 282-288 are applied to a four input NAND gate 290.

The Q and $\overline{Q}$ outputs of the second and fourth stages, latch 258 and 262, are processed through an exclusive OR function by AND gates 292 and 294 feeding to NOR gate 296. The output of NOR gate 296 is directed through a transmission gate 298, two inverters 300 and 302 and a transmission gate 306 to AND gate 314. The output of inverter 300 is also directed through a transmission gate 310 to an AND gate 316. The output of NAND gate 290 is applied through a transmission gate 308 to the input of AND gate 314, and also through an inverter 304 and a transmission gate 312 to the input of AND gate 316.

The outputs of AND gates 314 and 316 are applied to an OR gate 318 having an output providing the second input of NAND gate 265 as previously discussed. The output of transmission gate 312 provides an output signal PH directed to multiplexer 58 shown in FIG. 9. The clock signals HP1 and HP2 are applied to the control inputs of transmission gates 298, 306-312. The HP1 signal is fed to the N-channel control gates of transmission gates 282-288 and 298 while the HP2 signal is directed to the N-channel control gates of transmission gates 302-312.

The five stage counter 55 comprising latches 256-264 is connected to count through the 31 step five-bit sequence shown in Table II. The bit configuration is inverted with Stage 1 corresponding to the least significant bit and represented by latch 256 in the left hand position, and Stage 5 being the most significant bit counted by latch 264 in the right hand position. A "1" represents a positive Q output and a negative $\overline{Q}$ output, and a "0" represents the opposite output.

TABLE II

| Count | Stage 1 | 2 | 3 | 4 | 5 | Count | Stage 1 | 2 | 3 | 4 | 5 |
|---|---|---|---|---|---|---|---|---|---|---|---|
| 1 | 1 | 0 | 0 | 0 | 0 | 17 | 0 | 0 | 0 | 1 | 1 |
| 2 | 0 | 1 | 0 | 0 | 0 | 18 | 1 | 0 | 0 | 0 | 1 |
| 3 | 0 | 0 | 1 | 0 | 0 | 19 | 1 | 1 | 0 | 0 | 0 |
| 4 | 1 | 0 | 0 | 1 | 0 | 20 | 0 | 1 | 1 | 0 | 0 |
| 5 | 0 | 1 | 0 | 0 | 1 | 21 | 1 | 0 | 1 | 1 | 0 |
| 6 | 1 | 0 | 1 | 0 | 0 | 22 | 1 | 1 | 0 | 1 | 1 |
| 7 | 1 | 1 | 0 | 1 | 0 | 23 | 1 | 1 | 1 | 0 | 1 |
| 8 | 0 | 1 | 1 | 0 | 1 | 24 | 0 | 1 | 1 | 1 | 0 |
| 9 | 0 | 0 | 1 | 1 | 0 | 25 | 1 | 0 | 1 | 1 | 1 |
| 10 | 1 | 0 | 0 | 1 | 1 | 26 | 0 | 1 | 0 | 1 | 1 |
| 11 | 1 | 1 | 0 | 0 | 1 | 27 | 1 | 0 | 1 | 0 | 1 |
| 12 | 1 | 1 | 1 | 0 | 0 | 28 | 0 | 1 | 0 | 1 | 0 |
| 13 | 1 | 1 | 1 | 1 | 0 | 29 | 0 | 0 | 1 | 0 | 1 |
| 14 | 1 | 1 | 1 | 1 | 1 | 30 | 0 | 0 | 0 | 1 | 0 |
| 15 | 0 | 1 | 1 | 1 | 1 | 31 | 0 | 0 | 0 | 0 | 1 |
| 16 | 0 | 0 | 1 | 1 | 1 | | | | | | |

The counting sequence shown in Table II is the standard sequence for a conventional five stage free running counter with feedback from stages five and three through an exclusive OR function. This arrangement is shown in FIG. 7 except that gates 292-296 performing the exclusive OR function for the outputs of stages two and four. The feedback input signals taken one stage earlier because of propagation delays encountered in combining the conventional feedback signal with a second decode feedback signal to be discussed. Transmission gates 282-288 and 306-312 provide isolation and feedback synchronization to the stages of counter 55.

The second decode feedback signal is generated by the matrix formed by lines 266-272 connecting with the outputs of the five stages 256-264. If one of the lines 266-272 is activated by an input signal from one of the column inputs CD1-CD4, a decode feedback signal is generated by NAND gate 290 when the count of counter 55 reaches the value represented by the "0" connections for that line. This output signal is combined with the conventional feedback signal from NOR gate 296 in an exclusive OR function performed by gates 314-318. The resultant output is fed back to the five stage counter 55 to reset the counter on the next step to begin the counting cycle again. Thus, the complementary output from NAND gate 290 serves to reduce the number of steps in the counting sequence in accordance with the line in the matrix configuration generating the decode feedback signal. Line 266 is connected with the outputs of the five stages of counter 55 to count through a seventeen step sequence. Similarly, line 268 is connected for a nineteen step sequence, line 270 as a twenty-one step sequence and line 272 is connected for a twenty-three step counting sequence. Thus, an output signal PH is generated through NAND gate 290 at the end of each 17, 19, 21 or 23 count sequence, depending upon which of lines 266-272 have been activated.

For example, referring to line 266, the Q and $\overline{Q}$ output connections of each of the five stages 256-264 represent the count "00011" where each of the $\overline{Q}$ outputs represent a "0" and each of the Q outputs represent a "1". This configuration corresponds with step 17 in Table II. Thus, if an activated key in column four generates a signal on CD4 so that line 266 is activated, a decode feedback signal "1" is generated on line 266 to the input of counter 55 after step 18 because of the one step delay caused by the feedback circuitry. As can be seen from Table II, the least significant bit of step 19 is a "1" generated by feedback from stage five of step 18. However, when the feedback "1" bit is exclusive ORed with the decode feedback signal "1" produced by NAND gate 290 a "0" bit is generated for the least significant position in the next counting step, yielding a "01000" bit configuration, corresponding to step 2 in Table II. The counter 55 has therefore been reset to step 2 to begin its count again at that point. As long as input signal CD4 activates line 266 the seventeen step count sequence between steps 2 and 18 of Table II is continued.

Similarly, if a key in the third column of the keyboard 100 is depressed, the input signal CD3 activates line 268 which is connected to the outputs of counter 55 in the configuration "11010" corresponding to step 7 in Table II. Thus, a decode feedback "1" bit is generated to be exclusive ORed with the conventional feedback signal of counter 55 after the next counting step 8. Since the normal feedback bits from stages three and five are both "1"s, the normal feedback term would be a "0". However, the decode feedback "1" changes the input of stage one to a "1", thereby modifying the configuration of the next counting step to 37 "10110", corresponding to step 21 in Table II. Thus, while input signal CD3 activates line 268, the counter 55 sequences through a 19 step count from step 21 to step 8 of Table II.

Lines 270 and 272 perform similar counting sequences. Line 270 is connected to the five stage outputs in a "01011" configuration, corresponding to step 26. Step 27 is therefore the last count in the series and the counter is reset to step 7 for counting through a 21 step sequence. Finally, line 272 is connected to the five stage outputs in a "10011" configuration corresponding to step 10 in Table II. Step 11 is the decode step and the count is jumped to step 20 to begin a 23 count sequence ending with step 11.

From the foregoing, it is apparent that the frequency of 895 kilohertz, introduced by inputs HP1 and HP2, is divided by one of factors of 17, 19, 21 or 23 in response to the activation of one of lines 266, 268, 270 or 272, respectively to provide output signal PH for multiplexer 58.

Figure 8:
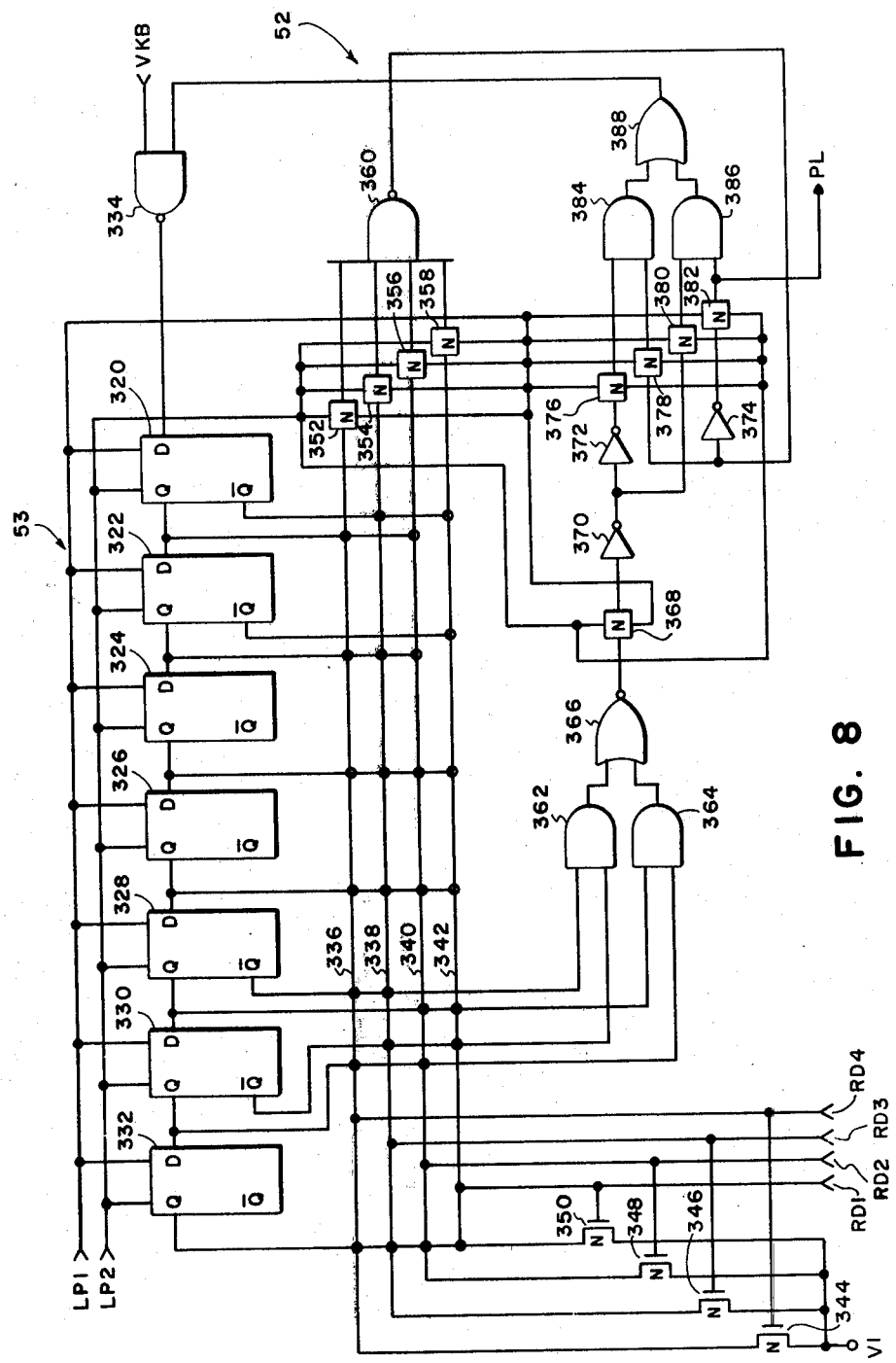

Reference is now made to FIG. 8 wherein the circuitry diagram of the programmed divider (low) 52 is shown. Divider 52 is similar in configuration and operation to divider 54 described in conjunction with FIG. 7 except that divider 52 uses a seven stage counter 53 wherein the seven stages comprise seven serially connected D-type latches 320-332. The clocking signals LP1 and LP2 having a frequency of 1.79 megahertz from the reference oscillator shown in FIG. 6 are fed to the control inputs for each of the seven stages. The first stage latch 320 receives its D input from NAND gate 334 which has a first input VKB and a second feedback input to be described later.

Figure 10:
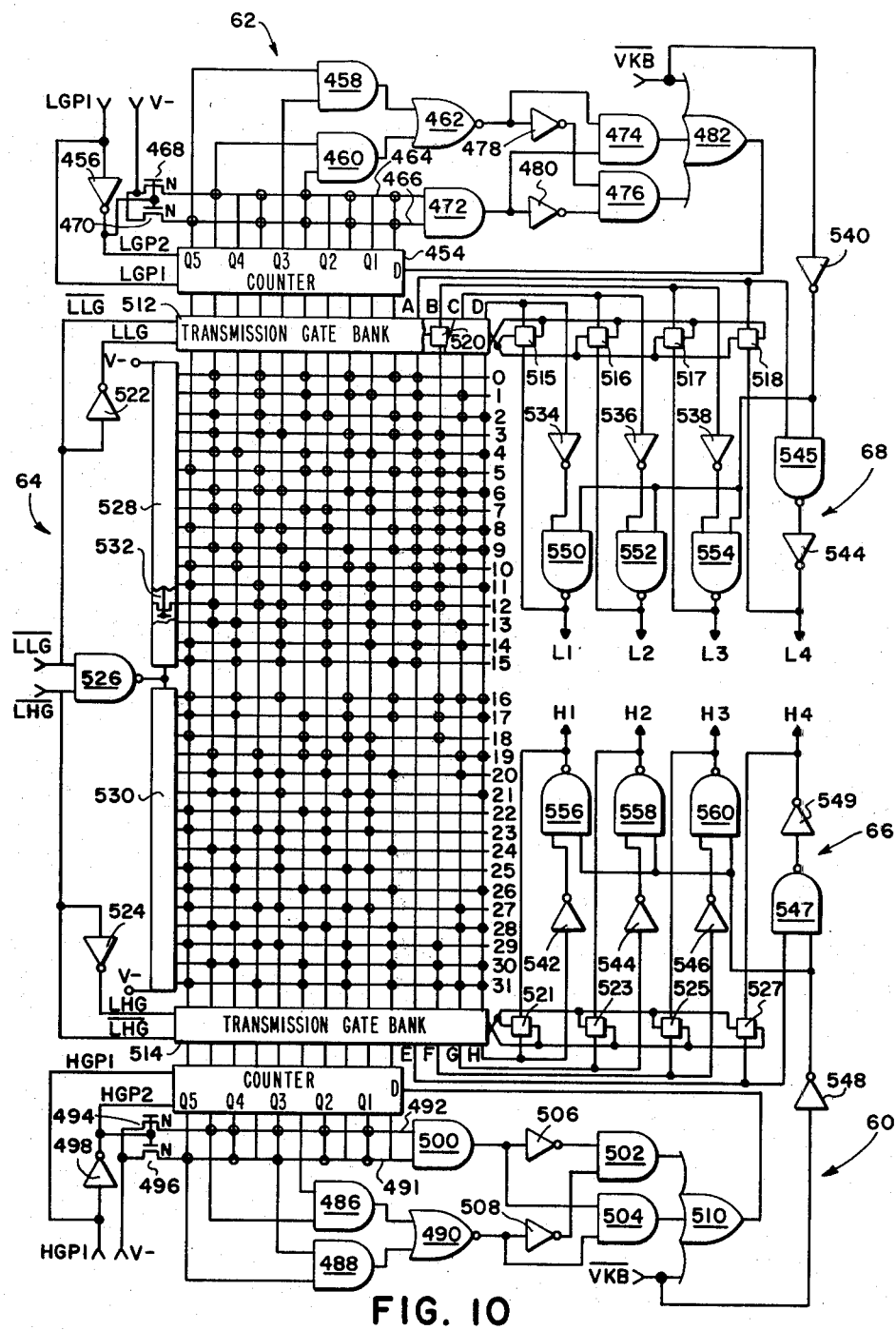
FIG. 10 is a circuit diagram of the programmed logic array and accompanying circuitry of the system of FIG. 2.

The Q and $\bar{Q}$ outputs of latches 320-332 are connected to form a decode matrix with four common lines 336-342 by conventional MOS transistor logic described in conjunction with FIG. 10 and symbolized by "0". The Q output of latch 320 is connected to lines 336 and 340 while the $\bar{Q}$ output is connected to lines 338 and 342. For latch 322, the Q output is joined to lines 336, 338 and 340 and the $\bar{Q}$ is connected to lines 342. Latches 324, 326 and 332 each have their Q outputs connected to each of the four lines 336-342, and their $\bar{Q}$ outputs are not connected to any of the lines. Latch 328 has its $\bar{Q}$ output joined to lines 340 and 342 and its Q output is connected to lines 336 and 338. The Q output of latch 330 is connected to lines 336 and 340 while the $\bar{Q}$ output is fastened to lines 338 and 342.

Lines 336-342 are connected to negative line voltage through N-channel MOS transistors 344-350, respectively. The gates of transistors 344-350 are connected to the RD1-RD4 row outputs respectively of the row decoder shown in FIG. 4. The RD1-RD4 signals are also connected respectively to lines 342, 340, 338 and 336. Lines 336-342 feed through transmission gates 352-358, controlled by input signals LP1 and LP2, to a four input NAND gate 360.

The Q and $\bar{Q}$ outputs of the fifth and sixth stages of counter 53, latches 328 and 330, are processed through an exclusive OR function by AND gates 362 and 364 and NOR gate 366. The output of NOR gate 366 is directed through a transmission gate 368 and inverter 370 to form a conventional feedback signal for a seven stage counter. This signal is exclusive ORed with the output signal of NAND gate 360, comprising the decode feedback signal. Specifically, the output of inverter 370 is directed through a transmission gate 380 to an AND gate 386. The output of inverter 370 is also inverted by inverter 372 and passed through a transmission gate 376 to the input of an AND gate 384. Similarly, the output of NAND gate 360 is applied through transmission gate 378 to AND gate 384 and through an inverter 374 and a transmission gate 382 to the input of AND gate 386. The outputs of both AND gates 384 and 386 are fed to OR gate 388 to form the feedback signal applied as the second input to NAND gate 334. As previously mentioned, the LP1 and LP2 input signals control transmission gates 352-358, 368 and 376-382. The LP1 signal is applied to the N-gate of transmission gates 352-358 and transmission gate 368. The LP2 signal is applied to the N-gates of transmission gates 376-382.

The output of OR gate 388 supplies the feedback signal providing the second input to NAND gate 334 together with the VKB input. The programmed divider (low) 52 circuit output PL is obtained from the output of transmission gate 382, comprising essentially the decode feedback output from NAND gate 360.

A conventional seven stage free-running counter having feedback from stages six and seven would normally count through a 128 step seven bit sequence as shown in Table 3. A "1" represents a positive Q output and a negative $\bar{Q}$ output, and a "0" represents the opposite output. The bit configuration is inverted with stage 1 representing the least significant bit being on the left side and stage 7 representing the most significant bit on the right side.

TABLE III

| Count | Stage<br>1 2 3 4 5 6 7 | Count | Stage<br>1 2 3 4 5 6 7 |
|---|---|---|---|
| 1 | 0 1 0 0 0 0 0 | 22 | 0 1 1 1 1 0 0 |
| 2 | 0 0 1 0 0 0 0 | 23 | 0 0 1 1 1 1 0 |
| 3 | 0 0 0 1 0 0 0 | 24 | 1 0 0 1 1 1 1 |
| 4 | 0 0 0 0 1 0 0 | 25 | 0 1 0 0 1 1 1 |
| 5 | 0 0 0 0 0 1 0 | 26 | 0 0 1 0 0 1 1 |
| 6 | 1 0 0 0 0 0 1 | 27 | 0 0 0 1 0 0 1 |
| 7 | 1 1 0 0 0 0 0 | 28 | 1 0 0 0 1 0 0 |
| 8 | 0 1 1 0 0 0 0 | 29 | 0 1 0 0 0 1 0 |
| 9 | 0 0 1 1 0 0 0 | 30 | 1 0 1 0 0 0 1 |
| 10 | 0 0 0 1 1 0 0 | 31 | 1 1 0 1 0 0 0 |
| 11 | 0 0 0 0 1 1 0 | 32 | 0 1 1 0 1 0 0 |
| 12 | 1 0 0 0 0 1 1 | 33 | 0 0 1 1 0 1 0 |
| 13 | 0 1 0 0 0 0 1 | 34 | 1 0 0 1 1 0 1 |
| 14 | 1 0 1 0 0 0 0 | 35 | 1 1 0 0 1 1 0 |
| 15 | 0 1 0 1 0 0 0 | 36 | 1 1 1 0 0 1 1 |
| 16 | 0 0 1 0 1 0 0 | 37 | 0 1 1 1 0 0 1 |
| 17 | 0 0 0 1 0 1 0 | 38 | 1 0 1 1 1 0 0 |
| 18 | 1 0 0 0 1 0 1 | 39 | 0 1 0 1 1 1 0 |
| 19 | 1 1 0 0 0 1 0 | 40 | 1 0 1 0 1 1 1 |
| 20 | 1 1 1 0 0 0 1 | 41 | 0 1 0 1 0 1 1 |
| 21 | 1 1 1 1 0 0 0 | 42 | 0 0 1 0 1 0 1 |
| 43 | 1 0 0 1 0 1 0 | 64 | 0 1 0 0 1 0 0 |
| 44 | 1 1 0 0 1 0 1 | 65 | 0 0 1 0 0 1 0 |
| 45 | 1 1 1 0 0 1 0 | 66 | 1 0 0 1 0 0 1 |
| 46 | 1 1 1 1 0 0 1 | 67 | 1 1 0 0 1 0 0 |
| 47 | 1 1 1 1 1 0 0 | 68 | 0 1 1 0 0 1 0 |
| 48 | 0 1 1 1 1 1 0 | 69 | 1 0 1 1 0 0 1 |
| 49 | 1 0 1 1 1 1 1 | 70 | 1 1 0 1 1 0 0 |
| 50 | 0 1 0 1 1 1 1 | 71 | 0 1 1 0 1 1 0 |
| 51 | 0 0 1 0 1 1 1 | 72 | 1 0 1 1 0 1 1 |
| 52 | 0 0 0 1 0 1 1 | 73 | 0 1 0 1 1 0 1 |
| 53 | 0 0 0 0 1 0 1 | 74 | 1 0 1 0 1 1 0 |
| 54 | 1 0 0 0 0 1 0 | 75 | 1 1 0 1 0 1 1 |
| 55 | 1 1 0 0 0 0 1 | 76 | 0 1 1 0 1 0 1 |
| 56 | 1 1 1 0 0 0 0 | 77 | 1 0 1 1 0 1 0 |
| 57 | 0 1 1 1 0 0 0 | 78 | 1 1 0 1 1 0 1 |
| 58 | 0 0 1 1 1 0 0 | 79 | 1 1 1 0 1 1 0 |
| 59 | 0 0 0 1 1 1 0 | 80 | 1 1 1 1 0 1 1 |
| 60 | 1 0 0 0 1 1 1 | 81 | 0 1 1 1 1 0 1 |
| 61 | 0 1 0 0 0 1 1 | 82 | 1 0 1 1 1 1 0 |
| 62 | 0 0 1 0 0 0 1 | 83 | 1 1 0 1 1 1 1 |
| 63 | 1 0 0 1 0 0 0 | 84 | 0 1 1 0 1 1 1 |
| 85 | 0 0 1 1 0 1 1 | 107 | 0 0 1 1 0 0 1 |
| 86 | 0 0 0 1 1 0 1 | 108 | 1 0 0 1 1 0 0 |
| 87 | 1 0 0 0 1 1 0 | 109 | 0 1 0 0 1 1 0 |
| 88 | 1 1 0 0 0 1 1 | 110 | 1 0 1 0 0 1 1 |
| 89 | 0 1 1 0 0 0 1 | 111 | 0 1 0 1 0 0 1 |
| 90 | 1 0 1 1 0 0 0 | 112 | 1 0 1 0 1 0 0 |
| 91 | 0 1 0 1 1 0 0 | 113 | 0 1 0 1 0 1 0 |
| 92 | 0 0 1 0 1 1 0 | 114 | 1 0 1 0 1 0 1 |
| 93 | 1 0 0 1 0 1 1 | 115 | 1 1 0 1 0 1 0 |
| 94 | 0 1 0 0 1 0 1 | 116 | 1 1 1 0 1 0 1 |
| 95 | 1 0 1 0 0 1 0 | 117 | 1 1 1 1 0 1 0 |
| 96 | 1 1 0 1 0 0 1 | 118 | 1 1 1 1 1 0 1 |
| 97 | 1 1 1 0 1 0 0 | 119 | 1 1 1 1 1 1 0 |
| 98 | 0 1 1 1 0 1 0 | 120 | 1 1 1 1 1 1 1 |
| 99 | 1 0 1 1 1 0 1 | 121 | 0 1 1 1 1 1 1 |
| 100 | 1 1 0 1 1 1 0 | 122 | 0 0 1 1 1 1 1 |

TABLE III-continued

| Count | Stage 1 2 3 4 5 6 7 | Count | Stage 1 2 3 4 5 6 7 |
|---|---|---|---|
| 101 | 1 1 1 0 1 1 1 | 123 | 0 0 0 1 1 1 1 |
| 102 | 0 1 1 1 0 1 1 | 124 | 0 0 0 0 1 1 1 |
| 103 | 0 0 1 1 1 0 1 | 125 | 0 0 0 0 0 1 1 |
| 104 | 1 0 0 1 1 1 0 | 126 | 0 0 0 0 0 0 1 |
| 105 | 1 1 0 0 1 1 1 | 127 | 1 0 0 0 0 0 0 |
| 106 | 0 1 1 0 0 1 1 | 128 | 0 1 0 0 0 0 0 |

The counting sequence shown in Table III is the standard sequence for a conventional seven stage free-running counter with feedback from stages six and seven through an exclusive OR function. In FIG. 8, gates 362-366 perform the exclusive OR function on the outputs of stages five and six because of the propagation delay problem discussion on conjunction with FIG. 7. The counter has been further modified by the decode matrix formed by lines 336-342 connecting with the outputs of the seven stages 320-332. Lines 336-342 provide a decode feedback signal through NAND gate 360 when one of the lines is activated by an input signal from row inputs RD1-RD4. This decode feedback signal is exclusive ORed with the conventional feedback signal from NOR gate 366 by gates 384-388. The resultant output is applied to the input of the first stage counter 53 through NAND gate 334 when VKB is positive. Thus, the decode feedback from NAND gate 360 reduces the steps in the counting sequence by one of four factors depending upon which line is activated, similar to the programmed divider 54 in FIG. 7. Specifically, line 336 is connected with the outputs of the seven stages of counter 53 to count through a 59 step sequence. Line 338 is connected for a 66 count sequence, line 340 has a 73 count sequence and line 342 is connected for a 80 count sequence. Thus, the output signal PL is generated through NAND gate 360 at the end of one of the 59, 66, 73 or 80 steps, depending upon which of lines 336-342 has been activated.

The shortened counting sequences are effected in the same manner as was previously described in connection with FIG. 7. The beginning state for the 59 count sequence is step 23, "0011110", and the end of the sequence is step 81, "0111101". The preceding step, step 80, reflects the configuration "1111011" of the line connections of line 336 to the stages of counter 53. In a similar manner, the 66 count sequence using line 338 begins at step 100 and ends at step 38 in Table II. The connections of line 340 to the outputs of counter 53 results in a 73 step count beginning at step 49 and ending on count 121. Finally, line 342 is connected to sequence counter 53 through an 80 step cycle beginning with step 25 and ending with step 104.

Figure 9:
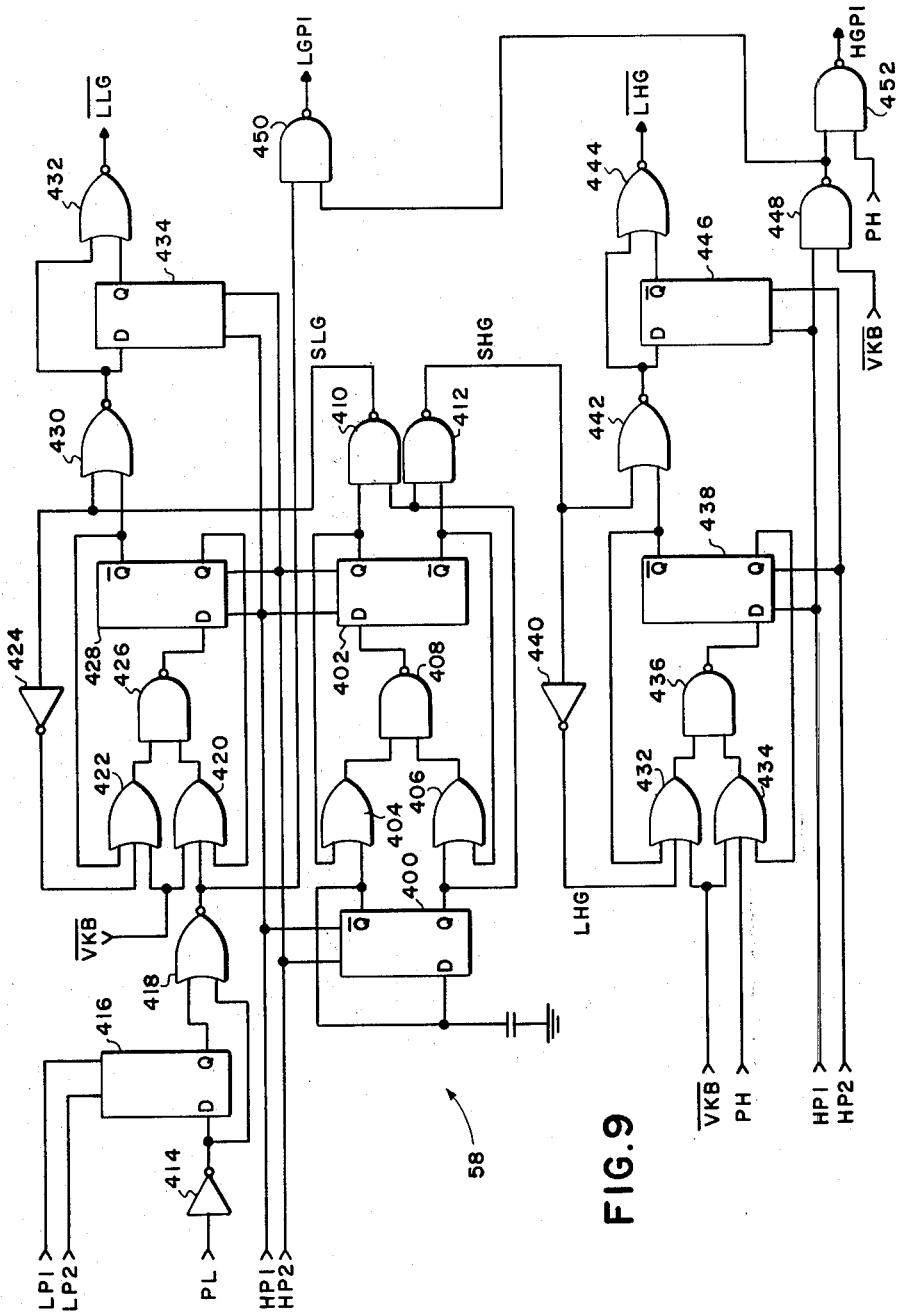
FIG. 9 is a circuit diagram of the multiplexer of the system of FIG. 2.

Referring now to FIG. 9, the circuit diagram for multiplexer 58 is shown. The reference frequency of 3.58 megahertz has already been divided to a lower frequency depending upon the row and column of an activated key on the keyboard. Multiplexer 58 alternates the inputs from the low and high group dividers 52 and 54 to the programmed logic array 54 so that only one logic array is required. The timing control signals used for the multiplexing function are designated SLG (sample low group) and SHG (sample high group). These timing signals are generated by latches 400 and 402, OR gates 404 and 406 and NAND gates 408, 410 and 412. Latches 400 and 402 both have control inputs HP1 and HP2 operating at 895 kilohertz. The $\overline{Q}$ output of latch 400 feeds back to its own D input so that the state of latch 400 is changed with each clock pulse. The Q output of latch 400 feeds to OR gate 406 having an output to NAND gate 408. Similarly, the $\overline{Q}$ output of latch 400 feeds to OR gate 404 which outputs to the other input of NAND gate 408. The second inputs of OR gates 404 and 406 are provided by the Q and $\overline{Q}$ outputs, respectively, of latch 402. The output of NAND gate 408 provides the D input for latch 402. The Q outputs of latches 400 and 402 are inputted to NAND gate 410. The Q output of latch 400 and the $\overline{Q}$ output of latch 402 are fed to the inputs of NAND gate 412.

By analyzing the circuitry just described, it can be seen that OR gates 404 and 406 together with NAND gate 408 perform an exclusive OR function on the Q outputs of latches 400 and 402. The output of the exclusive OR function is provided to the D input of latch 402. Since the Q output of latch 400 changes state with each clock pulse, it can be readily seen that the Q output of latch 402 will change states each second clock pulse. By NANDING the Q outputs of latches 400 and 402 as previously described, the SLG and SHG sample signals are generated, as shown in Table IV. It can be seen that the SLG and SHG signals count through a four step cycle with a negative SHG pulse every first count and a negative SLG pulse every third count.

TABLE IV

| COUNT | LATCH 400 Q | LATCH 400 $\overline{Q}$ | LATCH 402 Q | LATCH 402 $\overline{Q}$ | SLG | SHG |
|---|---|---|---|---|---|---|
| 1 | 1 | 0 | 0 | 1 | 1 | 0 |
| 2 | 0 | 1 | 1 | 0 | 1 | 1 |
| 3 | 1 | 0 | 1 | 0 | 0 | 1 |
| 4 | 0 | 1 | 0 | 1 | 1 | 1 |
| 5 | 1 | 0 | 0 | 1 | 1 | 0 |
| 6 | 0 | 1 | 1 | 0 | 1 | 1 |
| 7 | 1 | 0 | 1 | 0 | 0 | 1 |
| 8 | 0 | 1 | 0 | 1 | 1 | 1 |

The remainder of the circuitry of multiplexer 58 serves to generate clocking signals LGP1 and HGP1 to operate the shift registers 60 and 62, and to generate gating signals $\overline{LLG}$ and $\overline{LHG}$ to open and close access gates to the programmed logic array 64. The PL output of programmed divider 52 feeds through an inverter 414 to a D-type latch 416 controlled by the LP1 and LP2 signals from the reference oscillator 56. Latch 416 serves to widen the PL pulse from 550 nanoseconds to 1.1 microsecond. Since the clock rate of the programmed divider (low) 52 is twice that of the programmed divider (high) 54, it is necessary to stretch the PL signal to twice its time length to make the PL signal compatible with the PH signal from the programmed divider (high) 54. The output of inverter 414 is fed to a NOR gate 418 and through a latch 416 to the second input of NOR gate 418 to provide a one second delay. The pulse coming from NOR gate 418 is therefore twice in length the pulse leaving inverter 414.

The expanded PL pulse from NOR gate 418 is fed to the input of an OR gate 420, together with the VKB signal which is also fed to an adjacent OR gate 422. The SLG sample control signal is fed through an inverter 424 to a second input of OR gate 422. OR gates 420 and 422 output to a NAND gate 426 which feeds to the D input of a latch 428. The Q and $\overline{Q}$ outputs of latch 428 feed to third inputs of OR gates 420 and 422 respectively. The $\overline{Q}$ output of latch 428 is inputted, along with the sample control signal SLG, to a NOR gate 430 having an output fed directly to the input of a NOR gate 432 and indirectly through a D-type latch 434 to the second output of NOR gate 432.

Similar circuitry is provided for processing the PH input signal. Two OR gates 432 and 434 each have three inputs including a common input from $\overline{VKB}$. The PH signal is fed into OR gate 434 together with the Q output of a latch 438. The sample control signal SHG is fed through an inverter 440 to the input of OR gate 432 together with the $\overline{Q}$ output of latch 438. The outputs of OR gates 432 and 434 feed to a NAND gate 436 having an input to latch 438. The sample signal SHG and the $\overline{Q}$ output of latch 438 are inputted to NOR gate 442 which feeds directly to a NOR gate 444 and indirectly through a latch 446 to the second input of NOR gate 444. Latches 400, 402, 428, 434, 438 and 446 are all clocked by timing signals HP1 and HP2 so that the output signals $\overline{LLG}$ and $\overline{LHG}$ are synchronous.

The combination of gates 420–426, latch 428 and gate 430 with the inputs previously described form a circuit for providing an output only when the VKB signal is negative indicating a valid keyboard operation and the SLG sample signal is negative indicating a sample window for the row digital pulse PL. Similarly, gates 432–436, latch 438 and gate 442 provide an output signal from the column digital pulse PH only when there is a valid keyboard signal and the sample signal SHG is generated. Both output signals are again widened to 2.2 microsecond lengths by latches 434 and 446 and NOR gates 432 and 444, respectively. The outputs of gates 432 and 444 provide sampled signals $\overline{LLG}$ and $\overline{LHG}$ having frequencies previously selected by the programmed dividers.

The two clocking signals are generated for the shift register generators 60 and 62 by feeding the timed pulse input HP1 and the $\overline{VKB}$ control signal to a NAND gate 448. The output of gate 448 is fed to a NAND gate 450 together with the expanded PL signal from the output of NOR gate 418, to generate the output control signal LGP1. Similarly, the output of NAND gate 448 is inputted, together with the PH signal, to a NAND gate 452 to generate the control signal HGP1. The control signals will be described more fully in connection with the next figure.

Turning now to FIG. 10, the circuit diagram is shown for the programmed logic array 64, its input shift registers 60 and 62, and its output latches 66 and 68. Shift register 62 comprises a five stage counter 454 controlled by timing pulses LGP1 and its complement LGP2 via an inverter 456. Counter 454 is a standard five stage counter, similar to counter 55 shown in FIG. 7, and having five Q outputs, Q1–Q5. The $\overline{Q}$ outputs of counter 54 are to the immediate right of each of the respective Q outputs and are not lettered because of a lack of space. The feedback from the third and fifth stages are exclusive ORed through AND gates 458 and 460 and NOR gate 462, similar to a conventional free-running five stage counter with feedback form stages three and five.

A two-line decode matrix utilizes lines 464 and 466 intersecting with the outputs of counter 454 and connected at predetermined intersections by MOS transistor gates shown as "0". Lines 464 and 466 are each powered by an N-channel MOS transistor 468 and 470, respectively. Line 464 is connected to Q outputs of the first four stages and Q5 of the fifth stage. The input control signal LGP2 is applied to the gates of transistors 468 and 470. Lines 464 and 466 feed to an AND gate 472 having an output which provides the decode feedback signal for counter 454. This signal is exclusive ORed with the conventional feedback signal from the output of NOR gate 462 using AND gates 474 and 476, inverters 478 and 480 and a three input OR gate having $\overline{VKB}$ as its third input. The output of OR gate 482 is fed to the D input of the first stage Q1 of counter 454.

Shift register 60 has a similar configuration to shift register 62, and utilizes a five stage counter 484 having Q outputs Q1–Q5 and $\overline{Q}$ outputs on the immediate right of the respective Q outputs of each stage. The conventional feedback signal is obtained by feeding stages Q3 and Q5 through AND gates 486 and 488 and then through NOR gate 490. A two-line decode matrix comprising lines 492 and 494 is connected by MOS transistor gates in a predetermined configuration to the Q and $\overline{Q}$ outputs of counter 484. Lines 491 and 492 are connected through two N-channel MOS transistors 494 and 496 respectively to negative line voltage. Line 492 is connected to the Q outputs of all five stages, and line 491 is connected to the $\overline{Q1}, \overline{Q2}, \overline{Q3}, \overline{Q4}$ and Q5 outputs. The input control signal HGP1 and its complement HGP2 obtained by inverter 498 supply the pulse rate for counter 484, and signal HGP2 is connected to the gates of transistors 494 and 496.

Lines 491 and 492 input to AND gate 500 have an output comprising the decode feedback signal for counter 484. This signal is exclusive ORed with the conventional feedback signal from NOR gate 490 using AND gates 502 and 504, inverters 506 and 508 and a three-input OR gate 510 having the control signal $\overline{VKB}$ as its third input. The output of OR gate 510 is fed back to the D input of the first stage Q1 of counter 484.

The Q and $\overline{Q}$ outputs of counter 454 feed through a bank of transmission gates 512 to programmed logic array 64. Similarly, the Q and $\overline{Q}$ outputs of counter 484 input through a bank of transmission gates 514 to programmed logic array 64. The corresponding Q and $\overline{Q}$ outputs of counters 454 and 484 form ten common lines running vertically through the left hand portion of the programmed logic array 64, called the input portion of PLA 64. The four vertical lines on the right hand side of PLA 64 constitute the output position of the PLA.

Programmed logic array 64 is a two-dimensional grid of 14 vertical lines crossed by 32 horizontal lines. The intersection of horizontal and vertical lines each represent a potential transistor site with a transistor present where a circle "0" is shown. In most cases a transistor is present where a logic "1" is to be permanently programmed and absent where a logic "0" is to be programmed, forming a read-only memory (ROM). The most common method of storing the information (programming the ROM) is through the use of a custom gate-oxide mask. The process consists of diffusing normal P-type source and drain regions for the entire array and then growing a thick oxide layer over the wafer. The custom mask is then applied to selectively etch the oxide and define the program. If a "1" is to be stored in a particulate bit location, the thick oxide is etched away from the gate region at that location. If a "0" is to be stored, the oxide is not removed. Horizontal metal lines beneath the P-diffusions serve as the word-select lines, and the P-diffusions are the bit lines. Selecting one of the word lines turns on those transistors where a "1" is stored. If a "0" is present, the thick oxide over the "0" location prevents the word line potential from forming a conducting channel so that the output is zero.

The transmission gates of transmission gate banks 512 and 514 are not shown individually. However, it is understood that each Q output of counters 454 and 484 feed through a single transmission gate, similar to gate 520 as shown in transmission gate bank 516. Signals LLG and $\overline{LLG}$ clock the transmission gate, the $\overline{LLG}$ signal controlling the N-gates and signal $\overline{LLG}$ controlling the P-gates of the transmission gates in bank 512. Similarly, the $\overline{LHG}$ and $\overline{LHG}$ control signals clock transmission gates 514 and 518, with the $\overline{LHG}$ signal operating the N-gates of the transmission gates of bank 514 and the P-gates of the transmission gates of bank 518.

Counters 454 and 484 are programmed to count through the 32-step sequence shown in Table V.

TABLE V

| PLA LINE AND COUNTER STEP | COUNTER OUTPUTS TO PLA | | | | | PLA OUTPUT | BINARY VALUE IN DECIMAL |
|---|---|---|---|---|---|---|---|
| | Q5 | Q4 | Q3 | Q2 | Q1 | | |
| 0  | 0 | 0 | 0 | 0 | 0 | 1000 | 8 |
| 1  | 0 | 0 | 0 | 0 | 1 | 1010 | 10 |
| 2  | 0 | 0 | 0 | 1 | 0 | 1011 | 11 |
| 3  | 0 | 0 | 1 | 0 | 0 | 1100 | 12 |
| 4  | 0 | 1 | 0 | 0 | 1 | 1101 | 13 |
| 5  | 1 | 0 | 0 | 1 | 0 | 1110 | 14 |
| 6  | 0 | 0 | 1 | 0 | 1 | 1111 | 15 |
| 7  | 0 | 1 | 0 | 1 | 1 | 1111 | 15 |
| 8  | 1 | 0 | 1 | 1 | 0 | 1111 | 15 |
| 9  | 0 | 1 | 1 | 0 | 0 | 1111 | 15 |
| 10 | 1 | 1 | 0 | 0 | 1 | 1110 | 14 |
| 11 | 1 | 0 | 0 | 1 | 1 | 1101 | 13 |
| 12 | 0 | 0 | 1 | 1 | 1 | 1100 | 12 |
| 13 | 0 | 1 | 1 | 1 | 1 | 1011 | 11 |
| 14 | 1 | 1 | 1 | 1 | 1 | 1010 | 10 |
| 15 | 1 | 1 | 1 | 1 | 0 | 1000 | 8 |
| 16 | 1 | 1 | 1 | 0 | 0 | 0111 | 7 |
| 17 | 1 | 1 | 0 | 0 | 0 | 0101 | 5 |
| 18 | 1 | 0 | 0 | 0 | 1 | 0100 | 4 |
| 19 | 0 | 0 | 0 | 1 | 1 | 0011 | 3 |
| 20 | 0 | 0 | 1 | 1 | 0 | 0010 | 2 |
| 21 | 0 | 1 | 1 | 0 | 1 | 0001 | 1 |
| 22 | 1 | 1 | 0 | 1 | 1 | 0000 | 0 |
| 23 | 1 | 0 | 1 | 1 | 1 | 0000 | 0 |
| 24 | 0 | 1 | 1 | 1 | 0 | 0000 | 0 |
| 25 | 1 | 1 | 1 | 0 | 1 | 0000 | 0 |
| 26 | 1 | 1 | 0 | 1 | 0 | 0001 | 1 |
| 27 | 1 | 0 | 1 | 0 | 1 | 0010 | 2 |
| 28 | 0 | 1 | 0 | 1 | 0 | 0011 | 3 |
| 29 | 1 | 0 | 1 | 0 | 0 | 0100 | 4 |
| 30 | 0 | 1 | 0 | 0 | 0 | 0101 | 5 |
| 31 | 1 | 0 | 0 | 0 | 0 | 0111 | 7 |

The input portion of PLA 64 constitutes a modified read-only memory wherein a transistor present at the intersection of a horizontal line and a Q output represents a "1" bit, and a transistor present at the intersection of a horizontal line and a $\overline{Q}$ counter represents a "0" bit. It is apparent that each step in the count of counters 454 and 484 as shown in Table V, corresponds to the MOS transistor connections of the input portion of the same-numbered horizontal line in the read-only memory of PLA 64. For example, counter step 0 in Table V "00000" corresponds to the ten input connections in line 0 in PLA 64. The four vertical output lines on the right hand side of PLA 64 are connected in conventional read-only memory form, wherein the presence of a transistor at an intersection of a vertical and horizontal line represents a "1" bit and the absence of a transistor at an intersection represents a "0" bit. The configuration of each horizontal line of the PLA output corresponding to each counter step is shown on the right hand side of Table V.

Lines 0-31 of PLA 64 are activated by control signals $\overline{LLG}$ and $\overline{LHG}$ which are fed to a NAND gate 526. The output of gate 526 is connected to the gates of sixteen N-channel MOS transistors in each of transistor banks 528 and 530. Although each transistor is not individually shown, the transistors are represented by MOS transistor 532 which is connected between line 12 and negative line voltage V—. The other transistors in transistor banks 528 and 530 are similarly connected. The lines 0-31 are therefore turned on only when one of the gating signals $\overline{LLG}$ and $\overline{LHG}$ is present.

In operation, counters 454 and 484 sequence through the steps shown in Table V. The multiplexer 58 generates the $\overline{LLG}$ or $\overline{LHG}$ control signals to open either transmission gate bank 512 or transmission gate bank 514. The MOS transistor banks 528 and 530 are activated and the counter which has access to the input portion of PLA 64 pulses its counts from the Q and $\overline{Q}$ outputs sequentially activating lines 0 through 31 of PLA 64 in order. As each transistor in a given line is activated, a pulse is sent along the horizontal line thereby activating the output transistors of that line. The PLA output corresponding to the activated line is pulsed out on the four vertical output lines of PLA 64. The output portion of PLA 64 thus constitutes a second modified ROM in communication with the input ROM of PLA 64, wherein a transistor present at the intersection of a horizontal line and one of the A, B, C and D outputs represents a "1" bit and a transistor absent at each such intersection represents a "0" bit.

Figure 11:
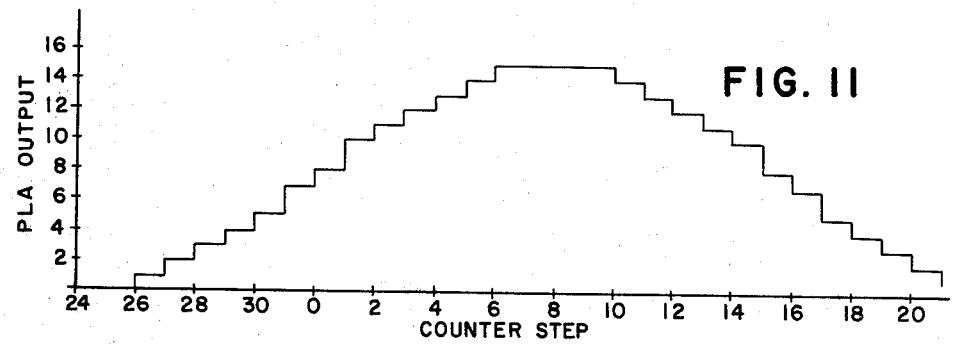
FIG. 11 is a graphic depiction of the output waveform of the programmed logic array of FIG. 10.

As shown in Table V, the PLA output comprises a four bit binary coded word which increases and decreases in binary value to represent a stepped sinusoidal waveform. The frequency of the sinusoidal waveform will be that of the clocking pulses LGP1 and HGP1 applied to counters 454 and 484, respectively, divided by 32 because of the 32 step cycle of the counters. Its frequency will reflect the frequency divisor selection made by one of the programmed dividers 52 and 54 and representative of the row or column of an actuated key. Thus, a series of binary coded words representing a stepped sinusoidal waveform 65 is generated, as shown in FIG. 11 with increasing and decreasing binary values shown therein corresponding to the counter steps as indicated in Table V.

The four output lines at the top of PLA 64 are gated through four transmission gates 515-518 to the four outputs L1-L4 respectively of latch 68. The PLA outputs also bypass transmission gates 515-518 and feed directly to the inputs of three inverters 534-538 and NAND gate 545, respectively. The outputs of inverters 534-538 are applied to three NAND gates 550-554, respectively. The second input of each of NAND gates 550-554 and 545 are supplied by the control signal VKB provided by inverter 540. NAND gate 545 feeds through inverter 544 to the L4 output of latch 68.

Similarly, the four output lines at the bottom of PLA 64 are directed through four transmission gates 521, 523, 525 and 527 to the four outputs H1-H4, respectively of latch 66. The PLA output lines also bypass the transmission gates and feed directly to the inputs three inverters 542-546 and NAND gate 547, respectively. The outputs of inverters 542-546 are applied to three NAND gates 556-560, respectively. The second inputs of each of NAND gates 556-560 and 547 comprise the control signal VKB provided by inverter 548. NAND gate 547 outputs through inverter 549 to connect to the H4 output of latch 66.

Figure 12:
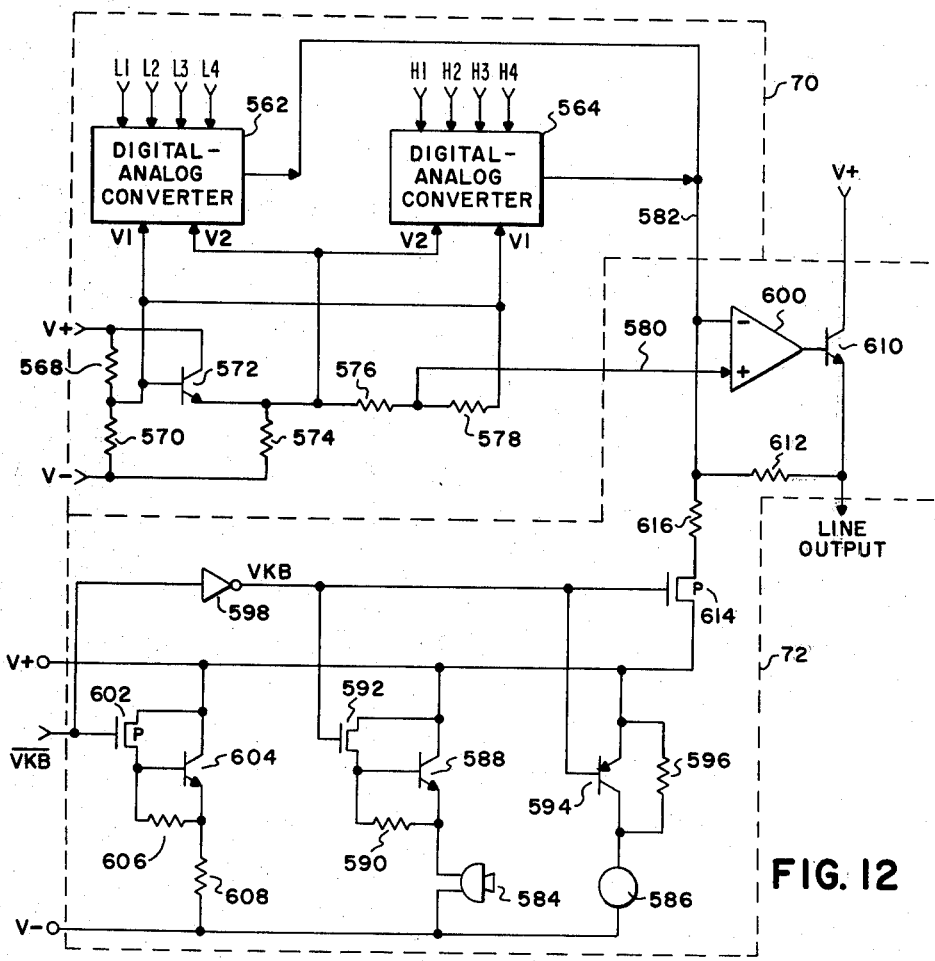
FIG. 12 is a circuit diagram of the digital-to-analog converter and output circuitry of the system of FIG. 2.

Referring now to FIG. 12, the digital-analog converter circuitry 70 and the output circuitry 74 are shown in greater detail. The L1–L4 outputs from latch 68 are fed into a digital-analog converter 562. Similarly, the four latch outputs H1–H4 are applied to a digital-analog converter 564. Converters 562 and 564 are conventional parallel input circuits which convert digital signals such as binary words to analog signals. The converters are preferably the type using R–2R resistor-ladder networks for voltage division of the parallel inputs, as shown in *Electronic Design*, Volume 22, Oct. 24, 1968, pages 54 and 55.

Reference voltages V1 and V2 are fed to converters 562 and 564 to provide the proper level of operation for the switches in the converter circuitry. Voltage V1 is obtained by tapping between serially-connected resistors 568 and 570 having their opposite ends connected to line voltages V+ and V− respectively. V1 is also fed to the gate of a bipolar transistor 572 having V+ line voltage at its collector and V− line voltage connected through a resistor 574 to its emitter. The emitter of transistor 572 is also fed through serially-connected resistors 576 and 578 to connect the the V1 reference voltage output. The emitter output of transistor 572 also provides the V2 reference input voltage for converters 562 and 564 having a polarity opposite that of reference voltage V1. A tap is also taken between transistors 576 and 578 to provide a reference voltage input on line 580 for an operational amplifier 600 in output circuitry 72. The outputs of converters 562 and 564 are combined on output line 582 to form a second input to operational amplifier 600.

As shown in FIG. 12, the common function switching operations are performed electronically using bipolar transistor logic, preferably on the same integrated circuit chip with the rest of the system. A transmitter 584 and a receiver 586 are connected across the telephone lines and are powered up when the keyboard is in operation and provides a valid key signal VKB. Transmitter 584 is connected between negative line voltage V− and the emitter of a PNP transistor 588 having its collector connected to positive line voltage V+. A bleeding resistor 590 is connected between the gate and the emitter of transistor 588, and a P-channel MOS transistor 592 is connected between the gate and the collector of transistor 588. Receiver 586 is connected between negative line voltage V− and the collector of a NPN bi-polar transistor 594 having its emitter connected to positive line voltage V+. A muting resistor 596 is connected across the emitter and collector of transistor 594. The gates of transistors 592 and 594 are both controlled by the VKB signal provided by an inverter 598.

When a positive VKB signal is received indicating that the keyboard has been activated, transistor 592 is turned off switching transistor 588 off and thereby deactivating the audio transmitter 584. Resistor 590 bleeds off any capacitive charge on transistor 592 to insure sharp cutoff. The positive VKB signal turns off transistor 594 thereby connecting muting resistor 596 in series with receiver 586 to mute the receiver against the transmitted dial tones.

A dummy load circuit is connected across the telephone lines and includes a P-channel MOS transistor 602 connected between the collector and the gate of a PNP bi-polar transistor 604. A bleeding resistor 606 is connected between the gate and the emitter of transistor 604, which is also connected through a dummy load resistor 608 to negative line voltage V−. The collector of transistor 604 and the source of transistor 602 are connected to positive line voltage V+. The gate of transistor 602 is controlled by the $\overline{VKB}$ input signal. When $\overline{VKB}$ is negative indicating the keyboard is in use, transistor 602 and 604 are switched on placing resistor 608 across the telephone lines. Thus, when there is a valid keyboard entry and the transmitter 584 is off, the dummy load 608 draws extra current to compensate for the transmitter circuitry being disconnected from the rest of the circuit.

When the keyboard is not being used, transistors 588, 592 and 594 are powered up, placing transmitter 584 and receiver 586 directly across the phone lines for receiving and transmitting audio frequencies. A positive $\overline{VKB}$ signal is received at the gate of transistor 602 turning it and transistor 604 off and removing the dummy load 608 from across the telephone lines. Resistor 606 bleeds off any capacitive charge on transistor 602 to insure sharp cutoff.

Amplifier 600 is a conventional operational amplifier which performs current-to-voltage conversion as well as summing the two sine waves received from digital-analog converters 562 and 564. The amplifier outputs to the gate of a PNP bi-polar transistor 610 having a collector tied to the positive line voltage V+ and an emitter connected to the input line 582 of amplifier 600 by a resistor 612. Line voltage V+ is applied through a P-channel MOS transistor 614 and a resistor 616 to the line 582 input channel of operational amplifier 600. The gate of transistor 614 is controlled by the VKB input signal.

The overall operation of the system of the present invention as shown in FIG. 2 will now be described. The system has three different modes—an on-hook mode with the entire system inactive, an off-hook standby mode with the audio transmitter and receiver connected to the telephone lines and the keyboard inactive, and an off-hook standby mode with the keyboard activated. In the off-hook standby mode the keyboard scan circuitry 44, scan signal generator 46, row decoder 48 and column decoder 50 are continuously operated to monitor the keyboard. The rest of the circuitry is powered up whenever a valid key signal has been received indicating that the keyboard is in operation.

During the off-hook standby mode, the scan signal generator shown in FIG. 6 continually applies scan signals S1 and S2 to the three-bit counter 85 of the keyboard scan circuitry shown in FIG. 3. This counter sequences through the eight-step cycle as shown in Table I, generating a two-count pulse sequentially to each of lines L1–L4 during the cycle. If any of the switches on the keyboard 100 are closed during the input of these monitoring pulses, the corresponding row and column lines are interconnected to feed the pulses out on one of the column outputs C1–C4. The row scanning pulses are also shortened and stabilized by NOR gates 118–124 and fed to the row decoder 48 shown in FIG. 4. The row pulses R1–R4 control transmission gates 126–132 to feed pulses through when one of the columns in the keyboard has been activated. The outputs of these transmission gates are then fed to a bank of NOR gates to yield row outputs RD1–RD4, each representative of a condition where the row pulse appears only on the row in question. NOR gate 166 and inverter 167 generate the signal VKB and its complement $\overline{VKB}$ indicating that a valid keyboard entry on one and only one row is present or absent, respectively.

As one of the pulse inputs C1–C4 is received by column decoder 50 of FIG. 5, the pulses are processed in a manner similar to or analogous to the row decoder of FIG. 4. Each pulse is stabilized and shortened by NAND gates 170–176 before being introduced to the control gates of transmission gates 178–184. Negative voltage pulses are passed through gates 178–184 when they are turned on and the resultant output signals with their complements are applied to the inputs of NOR gates 210–216 The outputs of column decoder 50, CD1–CD4, each represent the condition wherein one and only one column has been activated.

With the system in the off-hook standby mode, the scan signal generator shown in FIG. 6 provides continuous 100 kilohertz oscillator signals S1 and S2. Signal S1 is fed through NAND gates 238 and 248 to the power flip-flops 252 and 254 and on to the rest of the circuit. In this manner, the system is kept operational but runs at a much lower frequency in the standby mode, requiring less power than during the transmit mode. As the keyboard is activated, a positive VKB signal and a negative $\overline{\text{VKB}}$ signal are applied to the oscillator circuitry 56 shown in FIG. 6 turning off the clamping transsistor 242 so that the 3.58 megahertz crystal 250 begins oscillating with inverter 244, transmitting the high frequency 3.58 megahertz output frequency to power flip-flops 252 and 254. Flip-flop 252 divides the 3.58 megahertz frequency to 1.79 megahertz to provide output clock signals LP1 and LP2 for controlling the rate of operation of the row signal processing circuitry. The 1.79 megahertz frequency is further divided by flip-flop 254 to provide clock signals HP1 and HP2 having a frequency of 895 kilohertz for cycling the column signal processing circuitry.

As previously described in detail, the HP1 and HP2 clock pulses are fed to the programmed divider (high) circuit 54 shown in FIG. 7 for processing the column signals CD1–CD4. The five-stage counter 55 and its associated decode feedback matrix divide the 895 kilohertz input frequency by one of factors 17, 19, 21 and 23 depending upon whether the column pulses appear on the CD4, CD3, CD2 or CD1 inputs, respectively. In a similar fashion, the LP1 and LP2 clock frequencies are divided by programmed divider (low) 52 shown in FIG. 8 in accordance with the input row signals R1–R4. The seven stage counter 53 and its associated decode feedback matrix divides the input frequency by one of factors 59, 66, 73, or 80 depending upon whether the row pulses appear on the RD4, RD3, RD2 or RD1 inputs, respectively.

The outputs of programmed dividers 52 and 54, PL and PH, are pulse trains each having a frequency representative of the row or column, respectively, of an actuated key. The signals are fed in modified form to the programmed logic array 64 by way of multiplexer 58 and shift register 60 and 62. Multiplexer 58, shown in FIG. 9, processes pulses PL and PH into an acceptable format for PLA 64 as $\overline{\text{LLG}}$ and $\overline{\text{LHG}}$, and generates sampling pulses, SLG and SHG, to alternate the input of the row and column signals to PLA 64.

The multiplexer is operated at a frequency of 895 kilohertz, using clock signals HP1 and HP2. The sample signals, SLG and SHG are generated by latches 400 and 402 as well as gates 404–408, 410 and 412. The SLG and SHG signals are alternating negative pulses which are fed to the row portion and column portion, respectively, of the multiplexer 58. In the row portion, the SLG signal is combined with the PL input pulses and the $\overline{\text{VKB}}$ control signal. The output pulse is widened by latch 434 to provide gating pulse LLG having the frequency of the PL signal.

Similarly, the SHG sample signal is directed to the column portion of the multiplexer 58 where it is combined with the PH signal and the VKB control input. The combined pulse is widened by latch 446 and output as gating signal $\overline{\text{LHG}}$ having the frequency of the PH input signal.

Clock pulses HGP1 are generated by combining the HP1 clock frequency with the PL and PH inputs, respectively, and $\overline{\text{VKB}}$. The LGP1 and HGP1 signals provided the timing for shift register 60 and 62 at the HP1 frequency for intervals determined by the PL and PH frequencies.

Specifically, referring to FIG. 10, the LGP1 signal and its complement, LGP2, are fed to the clock inputs of five stage counter 454. Similarly, the HGP1 signal and its complement, HGP2, are fed to the clocking inputs of counter 484. Both counters clock through the 32 step sequence shown in Table V providing output signals after each count to transmission gate banks 512 and 514, respectively.

The $\overline{\text{LLG}}$ signal and its complement, LLG, turn transmission gate bank 512 on to pass the counter outputs to the input portion of PLA 64 during the row sample time reflected by the control signal $\overline{\text{LLG}}$. Similarly, during the column sample period, dictated by $\overline{\text{LHG}}$ and its complement, LHG, transmission gate bank 514 is opened providing the output of counter 484 to the input portion of PLA 64. During both sample periods, the $\overline{\text{LLG}}$ and $\overline{\text{LHG}}$ signals are input to transistor banks 528 and 530, thereby powering up the PLA 64.

The configuration of the input portion of PLA 64 is identical to the counter output sequence shown in Table V so that each step of counter 454 or counter 514 activates a line in the input portion of PLA 64, thereby activating the transistors in the output portion of the line and output pulses representative of the configuration of the output portion of that line.

For example, during count 1, counter 454 provides an output counting pulse "00001" which activates the read-only memory portion of line 1. An output pulse "1010" is thereby generated representative of the output portion of line 1. During step 2, counter 454 provides an output "00010" which activates line 2 in PLA 64 and provides an output pulse "1011". The output pulses are fed from the four lines of the output portion of PLA 64 through transmission gates 516–518 and 521–527, respectively, to latches 68 and 66, respectively. The resultant pulses L1–L4 and H1–H4 represent four digit binary coded words having binary values representative of the varying amplitude values of the sinusoidal waveform 65 as shown in FIG. 11. This close digital simulation of a sine wave eliminates the need for the use of filters or other complicated circuitry to generate an accurate sinusoidal waveform.

The stepped digital pulses of L1–L4 and H1–H4 are fed respectively to digital-analog converters 562 and 564 for conversion to analog sinusoidal waveforms. Converters 562 and 564 are provided with reference voltage inputs as previously described to adjust the amplitude of the sine waves and the outputs of converters 562 and 564 are summed by operational amplifier 600 which also converts the current-based input signals to a voltage-based output signal. Operational amplifier 600 is supplied with power from positive line voltage through MOS transistor 614 when a valid keyboard signal, VKB, is generated.

As shown in FIG. 12, the common functions of disconnecting the audio transmitter and attenuating the input to the receiver are performed electronically during the off-hook transmit mode. When a VKB signal is applied to the gates of transistors 592 and 594, transmitter 584 is disconnected from the telephone line and the muting resistor 596 is connected in series with the receiver 586. Transistor 604 is turned on placing dummy load 608 across the telephone lines to compensate for the removal of the audio transmitter load. When the system switches back to the off-hook standby mode, transistors 588 and 594 are switched on, placing the audio transmitter 584 and the audio receiver 586 directly across the telephone lines. Also during the standby mode, transistor 604 is switched off removing the dummy load resistor 608 from the telephone lines. As previously shown in FIG. 6, the common function of switching the oscillator off and on is also performed electronically using the input VKB and $\overline{\text{VKB}}$ signals acting on MOS circuitry.

The output of operational amplifier 600 is fed to transistor 610 which provides an analog sinusoidal waveform output for interfacing with standard telephone communication systems. The output is a combination of two sinusoidal waves having frequencies representative of the row and column of an actuated key on the keyboard. The frequencies of the output signals are compatible, within acceptable deviations, with the desired frequencies for conventional telephone systems, as shown in Table VI.

TABLE VI

| ROW (R) COL (C) | DESIRED FREQUENCY | INTEGRATED DEVISOR N | FREQUENCY OUTPUT (Hz) 3,579,545 (Hz) / N | PERCENT DEVIATION FROM DESIRED |
|---|---|---|---|---|
| R1 | 697 | 5120 | 699.1 | +.31 |
| R2 | 770 | 4672 | 766.2 | −.49 |
| R3 | 852 | 4224 | 847.4 | −.54 |
| R4 | 941 | 3776 | 948.0 | +.74 |
| C1 | 1209 | 2944 | 1215.9 | +.57 |
| C2 | 1336 | 2688 | 1331.7 | −.32 |
| C3 | 1477 | 2432 | 1471.9 | −.35 |
| C4 | 1633 | 2176 | 1645.0 | +.73 |

The integer divisors given in Table IV are the division factors needed to divide the oscillator reference frequency of 3.58 megahertz (more accurately 3,579,545 hertz) to obtain the desired output frequencies. These integers were obtained by combining the division factors of the two divide-by-two circuits in the reference oscillator circuitry 56, the division factors of the programmed dividers 52 and 54 and the divide-by-32 factor of the shift register generators 60 and 62. For example, for Column 4, Table VI shows an integer of 2176. This integer is provided by both divide-by-two circuits in reference oscillator 56 (factor of 4), the divide-by-seventeen sequence of programmed divider (high) 54 (factor of 17) and the divide-by-32 circuit of shift register generator 60 (factor of 32). The other integer divisors are provided in a similar manner.

Although an embodiment of the present invention has been described for use in conjunction with telephone communication systems, other similar applications are contemplated as being within the scope of the present invention. For example, the features of the present invention may also be used for other types of communication systems wherein information concerning the status of one or more locations must be transmitted, such as with burglar alarms, electronic combination locks, credit verification systems, and other remote control and signaling systems. The present invention is also useful in certain calculator applications wherein dual sinusoidal frequency outputs are required. Although the present system utilizes parallel processing, similar systems providing for serial processing and using the features described herein are included within the scope of the invention. Moreover, although a system is shown which is compatible with a single-pole, single-throw data input keyboard, it is understood that a modified system capable of processing the outputs of a double-pole, double-throw keyboard or some other compatible keyboard variation is within the scope of the present invention. Although the previously described embodiment includes a multiplexer circuit, it is understood that the multiplexer may be eliminated and a second programmed logic array may be implemented for simplicity of design without departing from the scope of the present invention.

Although a preferred embodiment of the present invention has been illustrated in the accompanying drawings and described in the foregoing detailed description, it will be understood that the invention is not limited to the embodiments disclosed, but is capable of numerous arrangements, modifications, and substitutions of parts and elements without departing from the spirit of the invention.

What is claimed is:

1. A telephone communication system adapted to be powered solely by telephone line inputs and including a multiple frequency signal generator on a complementary symmetry, metal oxide, semiconductor integrated circuitry chip for digitally synthesizing a dual-tone sinusoidal representative signal of a selected key on a keyboard comprising:
   a keyboard decode means on the chip responsive to the keyboard for generating a keyboard signal representative of the selected key;
   means on the chip responsive to the keyboard signal for generating a control signal in response to the selected key being enabled; and,
   common switching means on the chip responsive to the control signal for performing the common switching functions of the telephone communication system during generation of the sinusoidal representative signal including means for enabling oscillatory circuitry in said multiple frequency generator, means for disabling an audio transmitter and means for attenuating the output of a receiver.

2. The telephone communication system of claim 1 further including:
   a bipolar transistor having its collector connected to a positive line voltage of the telephone line inputs;

a field effect transistor connected across the collector and base of the bipolar transistor and gated by the control signal;

a bleeding resistor connected across the base and emitter of the bipolar transistor; and a load resistor connected between the emitter of the bipolar transistor and a negative line voltage of the telephone line inputs.

3. The telephone communication system of claim 1 further including:

a n-p-n bipolar transistor having it collector connected to a positive line voltage of the telephone line inputs;

a p-channel MOS field effect transistor connected across the collector and base of the bipolar transistor and gated by the complement of the control signal;

a bleeding resistor connected across the base and emitter of the bipolar transistor; and a load resistor connected across the emitter of the bipolar transistor and a negative line voltage of the telephone power line inputs.

4. The telephone communication system of claim 1 wherein the audio transmitter disabling means comprises:

a bipolar transistor having its collector connected to a positive line voltage of the telephone line inputs and its emitter connected to the audio transmitter;

a field effect transistor connected across the collector and base of the bipolar transistor and gated by the control signal; and, a bleeding resistor connected across the base and emitter of the bipolar transistor.

5. The telephone communication system of claim 1 wherein the audio transmitter disabling means comprises:

n-p-n bipolar transistor having its collector connected to a positive line voltage of the telephone line inputs and its emitter connected to the audio transmitter;

a p-channel MOS field effect transistor connected across the collector and base of the bipolar transistor and gated by the control signal; and, a bleeding resistor connected across the base and emitter of the bipolar transistor.

6. The telephone communication system of claim 1 wherein the receiver attenuating means comprises:

a bipolar transistor having its emitter connected to a positive line voltage of the telephone line inputs, its collector connected to the receiver, and its base connected to the control signal; and, a muting resistor connected across the emitter and collector of the bipolar transistor.

7. The telephone communication system of claim 1 wherein the receiver attenuating means comprises:

a p-n-p bipolar transistor having its emitter connected to a positive line voltage of the telephone line inputs, its collector connected to the receiver, and its base connected to the control signal; and, a muting resistor connected across the collector and emitter of the bipolar transistor.

8. The telephone communication system of claim 1 wherein the common switching means comprises:

a first bipolar transistor having its collector connected to a positive line voltage of the telephone line inputs;

a first field effect transistor connected across the collector and base of the first bipolar transistor and gated by the control signal;

a first bleeding resistor connected across the base and emitter of the first bipolar transistor;

a load resistor connected between the emitter of the first bipolar transistor and a negative line voltage of the telephone line inputs;

a second bipolar transistor having its collector connected to the positive line voltage;

a second field effect transistor connected across the collector and base of the second bipolar transistor and gated by the control signal;

a second bleeding resistor connected across the base and emitter of the second bipolar transistor;

the audio transmitter having a first terminal connected to the emitter of the second bipolar transistor and a second terminal connected to the negative line voltage;

a third bipolar transistor having its emitter connected to the positive line voltage and its base connected to the control signal;

a muting resistor connected across the emitter and collector of the third bipolar transistor;

the receiver having a first terminal connected to the collector of the third bipolar transistor and a second terminal connected to the negative line voltage; and, a third field effect transistor connected between the positive line voltage and the output circuitry of the telephone communication system and gated by the control signal.

9. A telephone communication system of claim 1 wherein the common switching means comprises:

a first n-p-n bipolar transistor having its collector connected to a positive line voltage of the telephone line inputs;

a first p-channel MOS field effect transistor connected across the collector and base of the first n-p-n bipolar transistor and gated by the complement of the control signal;

a first bleeding resistor connected across the base and emitter of the first n-p-n bipolar transistor;

a load resistor connected between the emitter of the first n-p-n bipolar transistor and a negative line voltage of the telephone line inputs;

an inverter for receiving the complement of the control signal and producing the control signal;

a second n-p-n bipolar transistor having its collector connected to the telephone communications system positive power supply;

a second p-channel MOS field effect transistor connected across the collector and base of the second n-p-n bipolar transistor and gated by the output of the inverter;

a second bleeding resistor connected across the base and emitter of the second n-p-n bipolar transistor;

the audio transmitter having a first terminal connected to the emitter of the second n-p-n bipolar transistor and a second terminal connected to the telephone communication system negative power supply;

a p-n-p bipolar transistor having its emitter connected to the positive line voltage and its base connected to the output of the inverter;

a muting resistor connected across the emitter and collector of the p-n-p transistor;

the receiver having a first terminal connected to the collector of the p-n-p bipolar transistor and a second terminal connected to the negative line voltage; and, a third p-channel MOS field effect transistor connected between the positive line voltage and the telephone communication output circuitry and gated by the output of the inverter.

10. The telephone communication system of claim 1 including reference oscillator circuitry and wherein the common switching means further comprises means for enabling the reference oscillator circuitry.

11. The telephone communication system of claim 10 wherein the means for enabling the reference oscillator circuitry comprises a field effect transistor gated by the control signal and connected between a positive line voltage of the telephone line inputs and a first terminal of the reference oscillator circuit.

12. The telephone communication system of claim 10 wherein the means for enabling the reference oscillator circuitry comprises:

a first NAND logic gate responsive to the control signal and a scan signal generator timing control signal;

a field effect transistor gated by the control signal and connected between a positive line voltage of the telephone line inputs and a first terminal of the oscillator circuit;

an inverter connected to the second terminal of the oscillator circuit; and, a second NAND logic gate responsive to the output of the first NAND gate and the inverter for passing through the output frequency of the reference oscillator circuit.

13. The telephone communications system of claim 12 wherein the field effect transistor of the means for enabling the reference oscillator circuit is a p-channel MOS field effect transistor and connected to the positive line voltage of the telephone line inputs and gated by an inverter signal from the complement of the control signal which is fed to the first NAND gate.

14. The telephone communication system of claim 10 wherein the common switching means connects the signal generator to a power supply in response to the control signal.

15. The telephone communication system of claim 14 wherein the power supply is the telephone input lines and the common switching means includes a bipolar transistor connected between the power supply and the system output and with its base driven by the signal generator.

16. The telephone communication system of claim 1 wherein the keyboard is comprised of a plurality of single-pole single-throw switches.

17. A telephone communication system including an audio transmitter, a receiver, a keyboard and a multiple frequency signal generator responsive to the keyboard, a common switching output circuit comprising:

a first bipolar transistor having its collector connected to a positive line voltage of telephone line inputs;

a first field effect transistor connected across the collector and base of the first bipolar transistor and activated when the keyboard is in use;

a first bleeding resistor connected across the base and emitter of the first bipolar transistor;

a dummy load resistor connected between the emitter of the first bipolar transistor and a negative line voltage of the telephone line inputs;

a second bipolar transistor having its collector connected to the positive line voltage and its emitter connected to a first terminal of the audio transmitter which has its second terminal connected to the negative line voltage;

a second field effect transistor connected across the collector and base of the second bipolar transistor and deactivated when the keyboard is in use;

a second bleeding resistor connected across the base and emitter of the second bipolar transistor;

a third bipolar transistor having its emitter connected to the positive line voltage, its collector connected to a first terminal of the receiver which has its second terminal connected to the negative line voltage, and which bipolar transistor is deactivated when the keyboard is in use;

an operational amplifier having as inputs the positive line voltage after passing through a series resistor and the signal from the multiple frequency generator to provide an output controlling the line output;

a fourth bipolar transistor responsive to the operational amplifier output and connected to the positive line voltage to provide the line output; and, a feedback resistor connected between the line output and the voltage input to the operational amplifier.

18. The telephone communication system of claim 17 further comprising an inverter connected between the gate of the first field effect transistor and the gates of the second and third field effect transistors and the base of the third bipolar transistor and wherein:

the first, second, and fourth bipolar transistors are n-p-n;

the field effect transistors are p-channel MOS;

the third bipolar transistor is p-n-p; and, the first field effect transistor is gated by a negative signal indicating that the keyboard is in use.

* * * * *